(12) United States Patent
Shimada et al.

(10) Patent No.: US 12,205,180 B2
(45) Date of Patent: Jan. 21, 2025

(54) PLANT CONTROL METHOD, PLANT CONTROL DEVICE, PROGRAM, AND PLANT

(71) Applicant: JGC CORPORATION, Kanagawa (JP)

(72) Inventors: Yohei Shimada, Kanagawa (JP); Mototaka Kai, Kanagawa (JP); Shuya Takakuwa, Kanagawa (JP); Yuki Hoshino, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 0 days.

(21) Appl. No.: 18/573,416

(22) PCT Filed: Jun. 23, 2021

(86) PCT No.: PCT/JP2021/023761
§ 371 (c)(1),
(2) Date: Dec. 21, 2023

(87) PCT Pub. No.: WO2022/269794
PCT Pub. Date: Dec. 29, 2022

(65) Prior Publication Data
US 2024/0265475 A1    Aug. 8, 2024

(51) Int. Cl.
*G06Q 50/06* (2024.01)
*G06Q 30/0201* (2023.01)
*G06Q 30/0283* (2023.01)

(52) U.S. Cl.
CPC ......... *G06Q 50/06* (2013.01); *G06Q 30/0206* (2013.01); *G06Q 30/0283* (2013.01)

(58) Field of Classification Search
None
See application file for complete search history.

(56) References Cited

U.S. PATENT DOCUMENTS

| 2008/0311022 A1 | 12/2008 | Carrington et al. | |
|---|---|---|---|
| 2011/0219773 A1* | 9/2011 | Gerrish | F02C 3/20 204/278 |

(Continued)

FOREIGN PATENT DOCUMENTS

| CN | 106977369 | | 12/2020 | |
|---|---|---|---|---|
| EP | 2560261 A1 | * | 2/2013 | ............ B60L 11/184 |

(Continued)

OTHER PUBLICATIONS

Tallaksen et al.; "Nitrogen fertilizers manufactured using wind power: greenhouse gas and energy balance of community-scale ammonia production"; Nov. 16, 2015; Elsevier; vol. 107; pp. 626-635; (Year: 2015).*

(Continued)

*Primary Examiner* — Omar Zeroual
*Assistant Examiner* — Jorge G Del Toro-Ortega
(74) *Attorney, Agent, or Firm* — JCIPRNET

(57) ABSTRACT

A calculation unit acquires first to third prices that are sales unit prices of a first product, a second product, and power generated by a power generation device. Based on at least one of the first to third prices, the calculation unit determines a first supply amount of the first product to a sales means, a second supply amount of the first product to a second manufacturing device, and a third supply amount of the first product to the power generation device. A control signal output unit outputs a control signal such that the first product is supplied to the sales means at the determined first supply amount, the first product is supplied to the second manufacturing device at the determined second supply amount, and the first product is supplied to the power generation device at the determined third supply amount.

14 Claims, 12 Drawing Sheets

(56) References Cited

U.S. PATENT DOCUMENTS

| | | | |
|---|---|---|---|
| 2012/0100062 A1* | 4/2012 | Nakamura | C01B 3/063 |
| | | | 252/375 |
| 2016/0023163 A1 | 1/2016 | Ostuni et al. | |
| 2021/0156560 A1 | 5/2021 | Ostuni et al. | |
| 2021/0287309 A1* | 9/2021 | Gebhardt | G05B 13/027 |
| 2023/0259088 A1* | 8/2023 | Borup | G06Q 10/06 |
| | | | 700/9 |

FOREIGN PATENT DOCUMENTS

| | | |
|---|---|---|
| JP | 2002233053 | 8/2002 |
| JP | 2003058605 | 2/2003 |
| JP | 2004171548 | 6/2004 |
| JP | 2005350299 | 12/2005 |
| JP | 2006037226 | 2/2006 |
| JP | 2007018284 | 1/2007 |
| JP | 2011130584 | 6/2011 |
| JP | 2014024985 | 2/2014 |
| JP | 2015038039 | 2/2015 |
| JP | 2015045483 | 3/2015 |
| JP | 2016050318 | 4/2016 |
| JP | 2019144897 | 8/2019 |
| JP | 2019170097 | 10/2019 |
| JP | 2019216501 | 12/2019 |
| JP | WO2019059321 | 10/2020 |
| WO | 2011108270 | 9/2011 |
| WO | 2018069993 | 4/2018 |
| WO | 2018078875 | 5/2018 |
| WO | 2020179849 | 9/2020 |

OTHER PUBLICATIONS

Zhu et al.; "Optimal operation of cryogenic air separation system with demand uncertainty and contractual obligation"; Mar. 1, 2011; Elsevier; vol. 66; pp. 953-963; (Year: 2011).*

"Decision on Opposition of Japan Counterpart Application No. 2022-700849", issued on Dec. 6, 2023, with English translation thereof, p. 1-p. 170.

Kazuo Hiroi, "Fundamentals and Applications of Digital Instrumentation and Control Systems", Kogyo Tech Co., Ltd., Aug. 1992, with partial English translation thereof, pp. 1-10.

"Basic Hydrogen Strategy", ministerial conference on renewable energy and hydrogen, Prime Minister's Office of Japan, Dec. 2017, with partial English translation thereof, pp. 1-37.

Ken-Ichi Aika, "Expecting LCA Data of "Energy Carrier": CO2 Free Hydrogen and Ammonia as Examples", Journal of Life Cycle Assessment Japan, vol. 12, Jul. 2016, with partial English translation thereof, pp. 1-10.

"Search Report of Europe Counterpart Application", issued on Feb. 9, 2024, p. 1-p. 14.

Masashige Tsuji, "Industrial Engineering", Apr. 20, 2010, with partial English translation thereof, pp. 10-13.

"Examination report of Australia Counterpart Application", issued on Oct. 6, 2022, pp. 1-7.

"Examination report of Australia Counterpart Application", issued on Feb. 10, 2023, pp. 1-3.

"Examination report of Australia Counterpart Application", issued on May 16, 2023, pp. 1-3.

"Notice of Reasons for Revocation of Japan Counterpart Application", issued on Nov. 15, 2022, with English translation thereof, pp. 1-165.

"Notice of Reasons for Revocation of Japan Counterpart Application", issued on May 22, 2023, with English translation thereof, pp. 1-210.

"International Search Report (Form PCT/ISA/210) of PCT/JP2021/023761", mailed on Sep. 28, 2021, with English translation thereof, pp. 1-4.

"Office Action of Australia Counterpart Application", issued on Oct. 14, 2024, p. 1-p. 7.

* cited by examiner

FIG. 8

PARAMETER STORAGE UNIT

| LABEL NAME | MEANING | PARAMETER VALUE (EXAMPLE) |
|---|---|---|
| LLL | LOWER LIMIT OF REFERENCE RANGE OF REMAINING AMOUNT IN STORAGE DEVICE | 3,000 [$Nm^3$] |
| HHL | UPPER LIMIT OF REFERENCE RANGE OF REMAINING AMOUNT IN STORAGE DEVICE | 30,000 [$Nm^3$] |
| TH_NH3_PRICE | DETERMINATION REFERENCE FOR PRICE OF AMMONIA | 500 [USD/ton] |
| TH_ELE_PRICE | DETERMINATION REFERENCE FOR PRICE OF POWER | 0.13 [USD/kWh] |
| ...... | ...... | ...... |

PLANT CONTROL METHOD, PLANT CONTROL DEVICE, PROGRAM, AND PLANT

CROSS-REFERENCE TO RELATED APPLICATION

This application is a 371 application of the International PCT application serial no. PCT/JP2021/023761, filed on Jun. 23, 2021. The entirety of the above-mentioned patent application is hereby incorporated by reference herein and made a part of this specification.

TECHNICAL FIELD

The present invention relates to a plant control method, a plant control device, a program, and a plant.

BACKGROUND ART

Use of variable renewable energy is expected to spread more and more in the future. As one form of a method for using variable renewable energy, it is conceivable to manufacture hydrogen using variable renewable energy, at least temporarily accumulate the manufactured hydrogen, and use the hydrogen in a subsequent step.

In addition, a price of hydrogen, a substance manufactured using hydrogen, power obtained by power generation using hydrogen, or the like varies. When the price of each of these substances or energy varies, it is desirable to further increase a revenue obtained from a plant or the like using variable renewable energy by preparing and implementing an appropriate operation plan.

For example, the invention described in Patent Literature 1 is based on a motivation to purchase and store power when a price of power is low and to sell power when the price of power is high in a power transaction market in which the price of power varies over time.

In the configuration described in Patent Literature 1, a purchase decision-making device receives the price of power in the power transaction market and purchases power according to a predetermined algorithm. The purchased power is stored in a power storage device. In addition, a sales decision-making device receives the price of power in the power transaction market and sells power according to a predetermined algorithm.

CITATION LIST

Patent Literature

Patent Literature 1: JP 2002-233053 A

SUMMARY OF INVENTION

Technical Problem

However, the technology described in Patent Literature 1 merely buys and sells power sold and bought in the power market. That is, the technology described in Patent Literature 1 is not particularly focused on utilization of variable renewable energy.

On the other hand, a substance manufactured by utilizing variable renewable energy (for example, hydrogen or the like) can be a material for manufacturing another substance by a chemical process or can generate power energy through a power generation process. In this way, a substance once manufactured can be changed into substances in various forms or energy. In such a case, it is very preferable to be able to change an economic value of a substance once manufactured to a larger value on the basis of a given condition.

The present application has been made in view of the above circumstances, and an object of the present application is to provide a plant control method, a plant control device, a program, and a plant that can perform automatic control so as to change an economic value of a substance manufactured by utilizing variable renewable energy to a larger value.

Solution to Problem

[1] In order to solve the above problems, a plant control method according to an aspect of the present invention is as follows. The plant control method is a method for controlling a plant including a storage device, a second manufacturing device, and a supply target facility of at least one of a power generation device and a sales means. The storage device receives and stores a manufactured first product from a first manufacturing device that manufactures the first product using power supplied from a power supply device that supplies power generated using variable renewable energy. The second manufacturing device manufactures a second product using the first product supplied from the storage device. The power generation device generates power using the first product supplied from the storage device. The sales means supplies the first product supplied from the storage device to the outside for sale. A calculation unit acquires at least one of a first price that is a sales unit price of the first product, a second price that is a sales unit price of the second product, and a third price that is a sales unit price of power generated by the power generation device. The calculation unit determines a second supply amount that is a supply amount of the first product to the second manufacturing device on the basis of the acquired at least one of the first price, the second price, and the third price. When the plant includes the sales means, the calculation unit determines a first supply amount that is a supply amount of the first product to the sales means on the basis of the acquired at least one of the first price, the second price, and the third price. When the plant includes the power generation device, the calculation unit determines a third supply amount that is a supply amount of the first product to the power generation device on the basis of the acquired at least one of the first price, the second price, and the third price. A control signal output unit outputs a control signal such that (1) the first product is supplied to the second manufacturing device at the determined second supply amount, (2) when the plant includes the sales means, the first product is supplied to the sales means at the determined first supply amount, and (3) when the plant includes the power generation device, the first product is supplied to the power generation device at the determined third supply amount.

[2] A plant control method according to an aspect of the present invention is the plant control method described above, in which the calculation unit first determines the second supply amount, and then, when the plant includes the sales means, the calculation unit determines to supply the first product to the sales means and determines the first supply amount as a value larger than 0, and when the plant includes the power generation device, the calculation unit determines to supply the first product to the power generation device and determines the third supply amount as a value larger than 0.

[3] A plant control method according to an aspect of the present invention is the plant control method described above, in which the plant includes the sales means and the power generation device.

[4] An aspect of the present invention is the plant control method described above, in which the calculation unit first determines the second supply amount, and then determines whether to make the third supply amount larger than the first supply amount or to make the first supply amount larger than the third supply amount on the basis of at least one of the first price and the third price.

[5] An aspect of the present invention is the plant control method described above, in which the calculation unit sets the first supply amount to zero when the third supply amount is made larger than the first supply amount, or sets the third supply amount to zero when the first supply amount is made larger than the third supply amount.

[6] An aspect of the present invention is the plant control method described above, in which when the second price is equal to or more than a predetermined reference value, the calculation unit makes the second supply amount larger than the supply amount of the first product to the supply target facility.

[7] An aspect of the present invention is the plant control method described above, in which when the second price is equal to or more than a predetermined reference value, the calculation unit sets the supply amount of the first product to the supply target facility to zero.

[8] An aspect of the present invention is the plant control method described above, in which when at least two of the first price, the second price, and the third price are given, the calculation unit obtains the second supply amount and the supply amount of the first product to the supply target facility on the basis of a predetermined evaluation function value determined by the at least two of the first supply amount, the second supply amount, and the third supply amount under a given constraint condition.

[9] An aspect of the present invention is the plant control method described above, in which the sales means is any one of a tank for storing the first product, a pipe for supplying the first product to another plant of a sales destination, and a pipe for loading the first product on a transportation means.

[10] An aspect of the present invention is the plant control method described above, having the following characteristics. The plant further includes a power distribution device that distributes power supplied from the power supply device to the first manufacturing device and a power sales facility for selling power. The calculation unit acquires a fourth price that is a sales unit price of power supplied from the power supply device. The calculation unit determines a sales power supply amount that is a supply amount of power to the power sales facility on the basis of the acquired at least one of the first price, the second price, the third price, and the fourth price. The control signal output unit outputs a control signal such that power is supplied from the power distribution device to the power sales facility at the determined sales power supply amount.

[11] An aspect of the present invention is the plant control method described above, having the following characteristics. The plant further includes a nitrogen manufacturing device that manufactures nitrogen and a nitrogen sales means that supplies nitrogen manufactured by the nitrogen manufacturing device to the outside for sale. The first product is hydrogen. The second product is ammonia. The second manufacturing device manufactures ammonia that is the second product using hydrogen that is the first product and nitrogen supplied from the nitrogen manufacturing device. The calculation unit acquires a nitrogen sales price that is a sales price of nitrogen. The calculation unit determines a sales nitrogen supply amount that is a supply amount of nitrogen to the nitrogen sales means at least on the basis of the nitrogen sales price. The control signal output unit outputs a control signal such that nitrogen is supplied from the nitrogen manufacturing device to the nitrogen sales means at the determined sales nitrogen supply amount.

[12] An aspect of the present invention is a plant control device for controlling a plant. The plant includes a storage device, a second manufacturing device, and a supply target facility of at least one of a power generation device and a sales means. The storage device receives and stores a manufactured first product from a first manufacturing device that manufactures the first product using power supplied from a power supply device that supplies power generated using variable renewable energy. The second manufacturing device manufactures a second product using the first product supplied from the storage device. The power generation device generates power using the first product supplied from the storage device. The sales means supplies the first product supplied from the storage device to the outside for sale. The plant control device includes a calculation unit and a control signal output unit. The calculation unit acquires at least one of a first price that is a sales unit price of the first product, a second price that is a sales unit price of the second product, and a third price that is a sales unit price of power generated by the power generation device. The calculation unit determines a second supply amount that is a supply amount of the first product to the second manufacturing device on the basis of the acquired at least one of the first price, the second price, and the third price. When the plant includes the sales means, the calculation unit determines a first supply amount that is a supply amount of the first product to the sales means on the basis of the acquired at least one of the first price, the second price, and the third price. When the plant includes the power generation device, the calculation unit determines a third supply amount that is a supply amount of the first product to the power generation device on the basis of the acquired at least one of the first price, the second price, and the third price. The control signal output unit outputs a control signal such that (1) the first product is supplied to the second manufacturing device at the determined second supply amount, (2) when the plant includes the sales means, the first product is supplied to the sales means at the determined first supply amount, and (3) when the plant includes the power generation device, the first product is supplied to the power generation device at the determined third supply amount.

[13] An aspect of the present invention is a program for causing a computer to function as the plant control device of described above.

[14] A plant according to an aspect of the present invention includes a storage device, a second manufacturing device, a supply target facility of at least one of a power generation device and a sales means, and a plant control device. The storage device receives and stores a manufactured first product from a first manufacturing device that manufactures the first product using power supplied from a power supply device that supplies power generated using variable renewable energy. The second manufacturing device manufactures a second product using the first product supplied from the storage device. The power generation device generates power using the first product supplied from the storage device. The sales means supplies the first product supplied from the storage device to the outside for sale. The plant control device includes a calculation unit and a control signal output unit. The calculation unit acquires at least one of a first unit price that is a sales unit price of the first product, a second price that is a sales unit price of the second product, and a third price that is a sales unit price of power generated by the power generation device. The calculation unit determines a second supply amount that is a supply amount of the first product to the second manufacturing device on the basis of the acquired at least one of the first price, the second price, and the third price. When the plant includes the sales means, the calculation unit determines a first supply amount that is a supply amount of the first product to the sales means on the basis of the acquired at least one of the first price, the second price, and the third price. When the plant includes the power generation device, the calculation unit determines a third supply amount that is a supply amount of the first product to the power generation device on the basis of the acquired at least one of the first price, the second price, and the third price. The control signal output unit outputs a control signal such that (1) the first product is supplied to the second manufacturing device at the determined second supply amount, (2) when the plant includes the sales means, the first product is supplied to the sales means at the determined first supply amount, and (3) when the plant includes the power generation device, the first product is supplied to the power generation device at the determined third supply amount.

Advantageous Effects of Invention

According to the present invention, a supply amount of the first product from the storage device for each supply destination can be determined according to the price of each of the first product, the second product, and power. That is, control can be performed such that a revenue of a plant becomes larger in response to a price variation and the like.

BRIEF DESCRIPTION OF DRAWINGS

FIG. 8 is a schematic diagram illustrating an example of a data configuration of a parameter storage unit in the first embodiment.

DESCRIPTION OF EMBODIMENTS

Hereinafter, a plurality of embodiments will be described with reference to the drawings.

First Embodiment

An outline of a case where the present embodiment is applied to a green ammonia manufacturing business is as follows. That is, in the green ammonia manufacturing business, in addition to green ammonia as a main product, sale in a form of hydrogen and sale of power by hydrogen power generation are also assumed. Here, a wholesale price of power and a price of a product (a substance such as hydrogen or ammonia) varies. Depending on such a price variation, an optimum application (power generation, hydrogen delivery, storage, or ammonia manufacturing) of a substance such as hydrogen and an optimum plant operation plan change. The present embodiment aims to automatically determine this operation plan to increase a profit of the green ammonia business. Note that needless to say, the present embodiment is also applicable to a business other than the green ammonia manufacturing business.

Next, a term (period of time) serving as a unit of control in the present embodiment will be described. A target term is a term in which control is performed. For example, the target term is a term having a length of two days or more and three months or less. For example, the target term may be a term having a length of two days or more and one month or less, and preferably a length of two days or more and two weeks or less (but is not limited thereto). In order to control the target term, data of various predicted values can be used. The data of predicted values is obtained on the basis of data in another term or prediction of an environment (climate, temperature, sunshine conditions, or the like). Note that a relationship between a term and data will be further described later with reference to FIG. 3.

Figure 1:
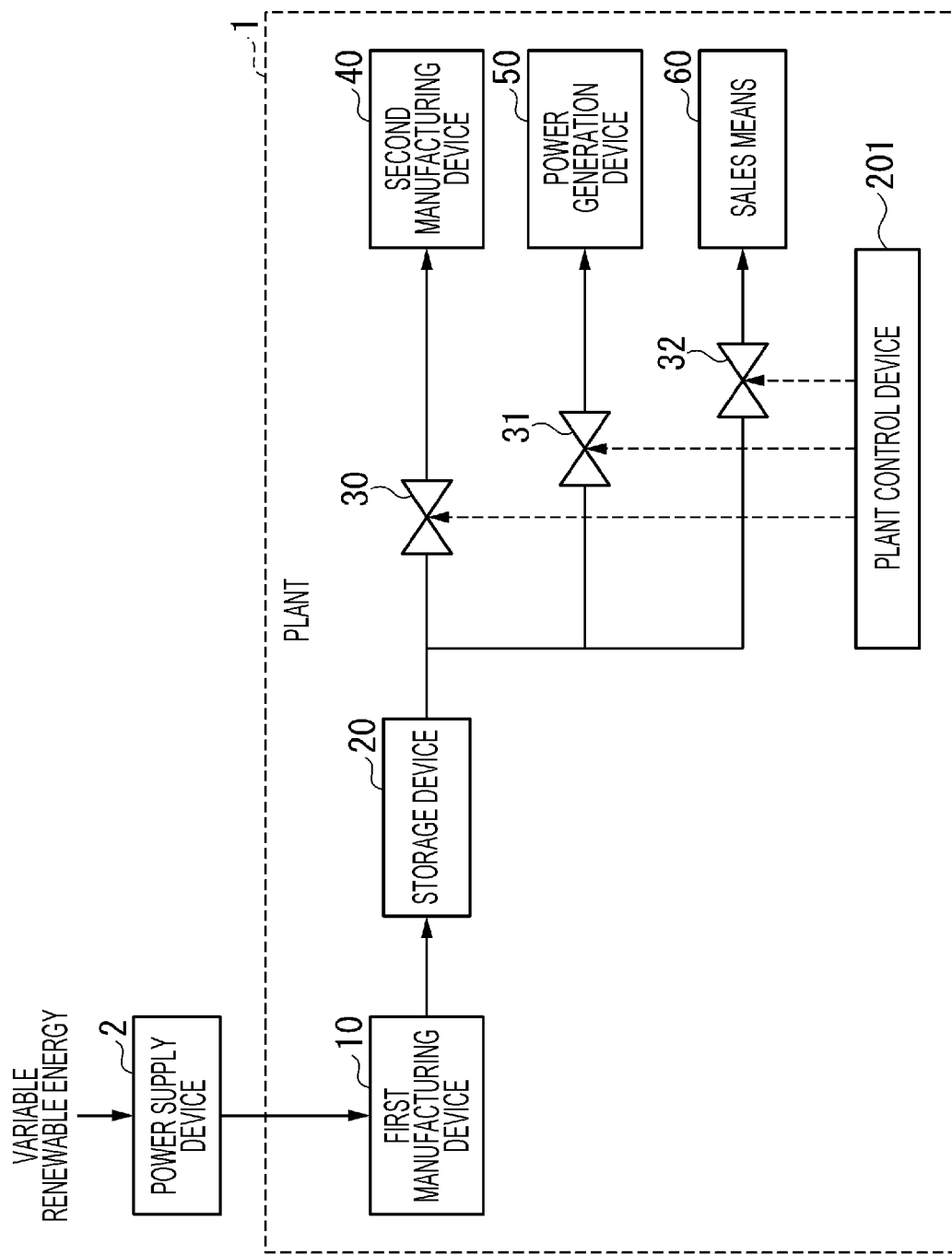
FIG. 1 is a block diagram illustrating a configuration of a plant according to a first embodiment.

FIG. 1 is a block diagram illustrating a configuration of a manufacturing plant according to the present embodiment. As illustrated, a plant 1 according to the present embodiment includes a first manufacturing device 10, a storage device 20, flow rate control valves 30, 31, and 32, a second manufacturing device 40, a power generation device 50, a sales means 60, and a plant control device 201. In addition, a power supply device 2 supplies power at least to the first manufacturing device 10. An outline of each of the above devices will be described later.

Note that a modification of the plant 1 can also be implemented. In a modification, the plant 1 may include the power supply device 2. Also in this case, the power supply device 2 supplies power to the first manufacturing device 10. In another modification, the plant 1 may include neither the power supply device 2 nor the first manufacturing device 10. Also in this case, the power supply device 2 and the first manufacturing device 10 are present outside the plant 1. A first product (described later) manufactured by the first manufacturing device 10 is delivered to the storage device 20.

In the present embodiment, the first product is, for example, hydrogen (represented by a chemical formula $H_2$). Hydrogen can be manufactured by electrolyzing water ($H_2O$) using power supplied by the power supply device 2. In addition, in the present embodiment, the second product is, for example, ammonia (represented by a chemical formula $NH_3$). Ammonia can be manufactured using hydrogen that is the first product and nitrogen ($N_2$) taken in from the air.

The second product is not limited to ammonia exemplified above. The second product may be another substance (chemical substance) manufactured using hydrogen as one of raw materials. The second product may be, for example, methanol, an organic hydride, methane, carbon monoxide, light oil, hydrogen peroxide, liquid hydrogen, or the like, but is not limited to the substances exemplified here.

The power supply device 2 supplies power generated using variable renewable energy at least to the first manufacturing device 10. The power supply device 2 may generate power using variable renewable energy. Alternatively, the power supply device 2 may receive power generated by another device using variable renewable energy and supply the received power to the first manufacturing device 10. For example, the power supply device 2 may be a power transmission facility (a power transmission line or the like).

The variable renewable energy is energy whose output largely varies depending on natural conditions and the like. The variable renewable energy is also referred to as, for example, "natural renewable energy" or "renewable energy". Examples of the variable renewable energy include solar energy, wind energy, and tidal force energy. The variable renewable energy is used to generate power.

The first manufacturing device 10 manufactures hydrogen by water electrolysis using power supplied at least from the power supply device 2 (power obtained from variable renewable energy). In other words, the first manufacturing device manufactures the first product using power supplied from the power supply device 10 that generates power using variable renewable energy. That is, the first manufacturing device 10 manufactures hydrogen ($H_2$) and oxygen ($O_2$) using water ($H_2O$) as a raw material. The hydrogen manufactured by the first manufacturing device 10 is delivered to the storage device 20 through a pipe or the like. The oxygen manufactured by the first manufacturing device 10 is delivered to another storage device (not illustrated) through, for example, a pipe.

The storage device 20 receives and at least temporarily stores the hydrogen manufactured by the above first manufacturing device 10. The storage device 20 is, for example, a tank for storing a liquefied gas or a gas. The storage device 20 includes a measuring instrument for measuring the amount of hydrogen remaining in the device. The storage device 20 can deliver data of the amount of hydrogen in the device to the plant control device 201. In the storage device 20, a reference range of a storage amount may be set. The reference range is represented by at least one of a lower limit value and an upper limit value of the storage amount in the storage device 20 (for example, a unit such as a percentage or a normal cubic meter). For example, in order to maintain operation of the second manufacturing device 40, the storage amount in the storage device 20 may need to be equal to or more than the above lower limit value.

Each of the flow rate control valves 30, 31, and 32 is a valve for controlling a flow rate of the first product supplied from the storage device 20. The flow rate control valve 30 is disposed on a route of, for example, a pipe for supplying the first product from the storage device 20 to the second manufacturing device 40. The flow rate control valve 31 is disposed on a route of, for example, a pipe for supplying the first product from the storage device 20 to the power generation device 50. The flow rate control valve 32 is disposed on a route of, for example, a pipe for supplying the first product from the storage device 20 to the sales means 60. Each of the flow rate control valves 30, 31, and 32 includes, for example, a mechanism that can steplessly change a throttle opening. The throttle opening of each of the flow rate control valves 30, 31, and 32 can be changed on the basis of a control signal from the plant control device 201.

The second manufacturing device 40 manufactures a second product using the first product supplied from the storage device 20 as a raw material. To the second manufacturing device 40, a raw material other than the first product necessary for manufacturing the second product is also supplied. As described above, the second manufacturing device 40 manufactures, for example, ammonia ($NH_3$) that is the second product using hydrogen and nitrogen as raw materials. The second manufacturing device 40 consumes hydrogen that is the first product supplied from the storage device 20 as one of the raw materials.

The second product manufactured by the second manufacturing device 40 can be used by a business operator operating the plant 1, or can be sold to an external business operator or the like. When the second product is sold, the business operator operating the plant 1 can receive a consideration for the second product. A sales price of the second product here will be described later.

The power generation device 50 generates power using the first product supplied from the storage device 20. When the first product is hydrogen, the power generation device 50 converts energy released when hydrogen is combusted (oxidized) into electric energy. Note that a mechanism itself of power generation by the power generation device 50 may use an existing technique.

Power generated by the power generation device 50 can be consumed by the business operator operating the plant 1, or can be supplied to the outside using a power transmission line, a power storage means, or the like. When power is supplied to an external business operator or the like, the business operator operating the plant 1 can receive a consideration for the power. That is, power generated by the power generation device 50 can be sold. A sales price of power here will be described later.

The sales means 60 is a facility, a device, or the like for selling the first product (as described above, for example, hydrogen) itself supplied from the storage device 20. The sales means 60 may be, for example, a storage device (a tank or the like) for storing the first product for sale, a pipeline or the like for supplying the first product to another place, or a facility for loading the first product on a transportation means (a ship, a truck, or the like, but not limited thereto). In other words, the sales means 60 may be, for example, any one of a tank for storing the first product, a pipe for supplying the first product to another plant of a sales destination, and a pipe for loading the first product on a transportation means. In addition, the sales means 60 may be a means other than the facility and the device exemplified here.

When the first product is sold to an external business operator or the like, the business operator operating the plant 1 can receive a consideration for the first product. A sales price of the first product here will be described later.

The plant control device 201 controls manufacturing of a product by the plant 1. In particular, the plant control device 201 controls a supply amount of the first product from the storage device 20 to each of the second manufacturing device 40, the power generation device 50, and the sales means 60 in each term (period of time). Therefore, the plant control device 201 outputs a control signal for individually controlling a throttle opening of each of the flow rate control valves 30, 31, and 32. Note that the first product supply amount from each of the flow rate control valves 30, 31, and 32 is a time integral of a product of each throttle opening and a flow velocity (length of flow per unit time) of the first product. In other words, the supply amount of the first product from each of the flow rate control valves 30, 31, and 32 is a time integral of a flow rate per unit time (the flow rate depends on the throttle opening of the flow rate control valve 30). Note that the control may be performed by measuring an actual flow rate of the first product using a flowmeter or the like, and feeding the measured flow rate back to the plant control device 201.

One term has, for example, a length of two days or more and three months or less. One term may have, for example, a length of about two days or more and about one month or less, and preferably may have a length of two days or more and two weeks or less. However, the length of one term is not limited thereto. Note that continuous operation of the plant according to a fixed plan for a certain period of time leads to improvement of operation efficiency. When the length of one term is too short, the operation efficiency of the plant is deteriorated. Conversely, when the length of one term is too long, for example, an environmental variation (a variation in the amount of solar radiation or the like) in the term is too large to make it difficult to design an appropriate operation plan. The length of one term is desirably set appropriately in view of such circumstances.

In FIG. 1, power is supplied from the power supply device 2 to the first manufacturing device 10. In addition, the first product (for example, hydrogen as described above) manufactured by the first manufacturing device 10 is delivered from the first manufacturing device 10 to the storage device 20. The first product is supplied from the storage device 20 to the second manufacturing device 40 through the flow rate control valve 30. The first product is supplied from the storage device 20 to the power generation device 50 through the flow rate control valve 31. The first product is supplied from the storage device 20 to the sales means 60 through the flow rate control valve 32. A control signal is sent from the plant control device 201 to each of the flow rate control valves 30, 31, and 32. The control signal controls an opening of each of the flow rate control valves 30, 31, and 32. In other words, the control signal controls the supply amount of the first product to each of the second manufacturing device 40, the power generation device 50, and the sales means 60.

Figure 2:
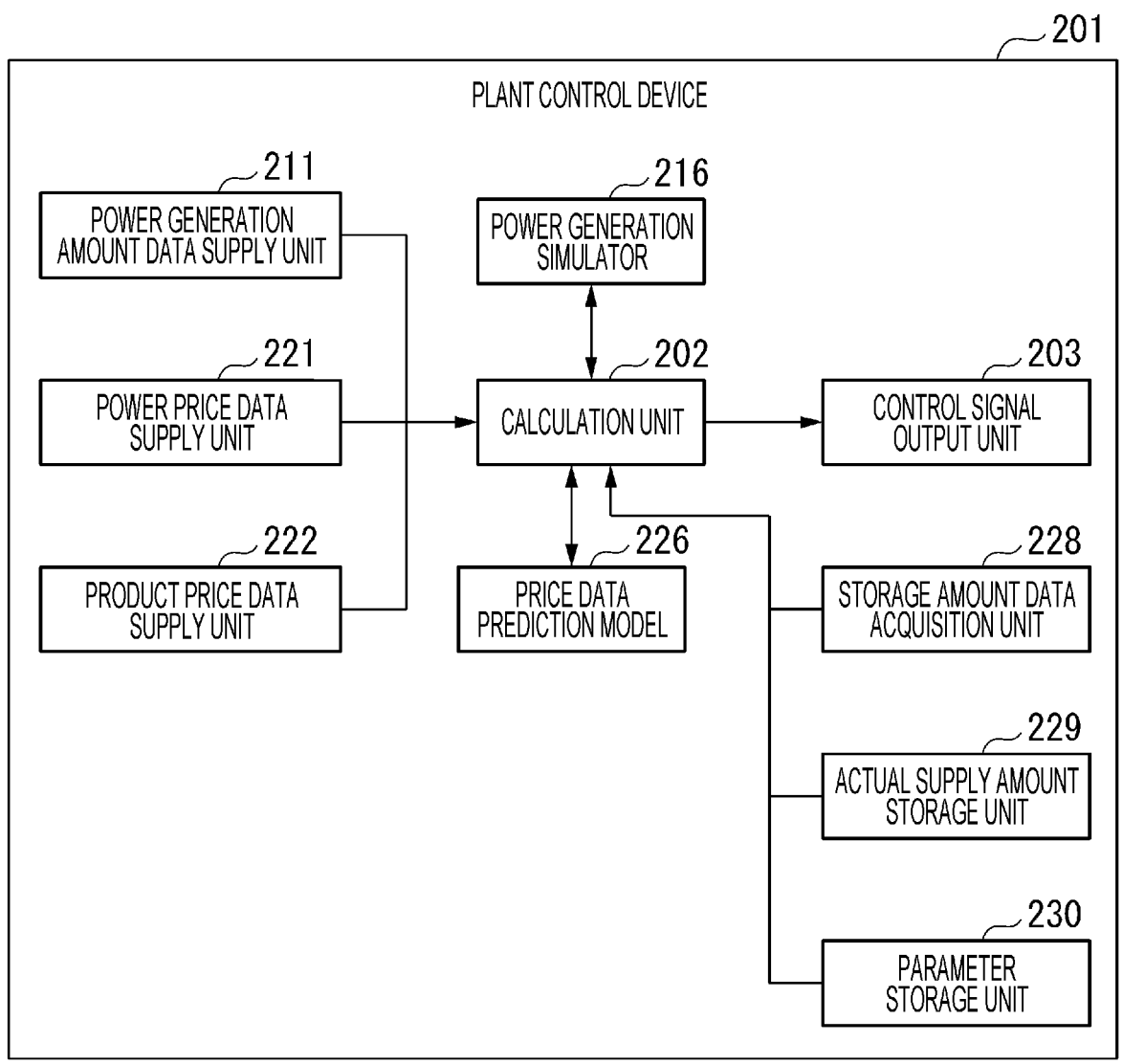
FIG. 2 is a block diagram schematically illustrating an internal functional configuration in a plant control device in the first embodiment.

FIG. 2 is a block diagram schematically illustrating an internal functional configuration in the plant control device 201. As illustrated, the plant control device 201 includes a calculation unit 202, a control signal output unit 203, a power generation amount data supply unit 211, a power generation simulator 216, a power price data supply unit 221, a product price data supply unit 222, a price data prediction model 226, a storage amount data acquisition unit 228, an actual supply amount storage unit 229, and a parameter storage unit 230. The plant control device 201 is implemented using, for example, an electronic circuit. The plant control device 201 may be implemented using a computer and a program. Each unit constituting the plant control device 201 may include a storage device, if necessary. The storage device is implemented using, for example, a semiconductor memory or a magnetic hard disk. A function of each unit constituting the plant control device 201 is as follows.

The calculation unit 202 calculates a signal value and the like for controlling the plant 1 on the basis of a given condition and data. Specifically, the calculation unit 202 obtains, for example, a signal value for further increasing a revenue of the plant 1 on the basis of the amount of supplied power, a price of a product in the market or the like, a price of power in the market or the like, and a storage amount in the storage device 20. Alternatively, the calculation unit 202 may obtain a signal value for optimizing the revenue of the plant 1.

The calculation unit 202 acquires a first price that is a sales unit price of the first product, a second price that is a sales unit price of the second product, and a third price that is a sales unit price of power generated by the power generation device. These pieces of information can be acquired by the plant control device 201 as described separately. Then, on the basis of at least one of the first price, the second price, and the third price, the calculation unit 202 determines a first supply amount that is a supply amount of the first product to the sales means, a second supply amount that is a supply amount of the first product to the second manufacturing device, and a third supply amount that is a supply amount of the first product to the power generation device.

The calculation unit 202 can obtain a signal value output from the plant control device 201 by, for example, the following procedure. That is, the calculation unit 202 first determines a supply amount of the first product to each of the second manufacturing device 40, the power generation device 50, and the sales means 60 in a target term. Next, the calculation unit 202 obtains openings of the flow rate control valves 30, 31, and 32 on the basis of the respective supply amounts. Then, the calculation unit 202 determines respective signal values to the flow rate control valves 30, 31, and 32 for implementing the openings of the valves.

The control signal output unit 203 outputs a control signal based on a result obtained by the calculation unit 202. Specifically, the control signal output unit 203 outputs a control signal for controlling the openings of the flow rate control valves 30, 31, and 32. As a result, the control signal output unit 203 controls the flow rate of the first product in each of the flow rate control valves 30, 31, and 32. Furthermore, the control signal output unit 203 outputs a signal for controlling an operating state of each of the second manufacturing device 40, the power generation device 50, and the sales means 60.

Note that the control signal output unit 203 outputs a control signal such that the first product is supplied to the sales means at the first supply amount determined by the calculation unit 202. In addition, the control signal output unit 203 outputs a control signal such that the first product is supplied to the second manufacturing device at the second supply amount determined by the calculation unit 202. In addition, the control signal output unit 203 outputs a control signal such that the first product is supplied to the power generation device at the third supply amount determined by the calculation unit 202.

The power generation amount data supply unit 211 supplies data regarding one or both of an actual value and a predicted value of the power generation amount of the power supply device 2 to the calculation unit 202. Note that the power generation amount of the power supply device 2 corresponds to the power supply amount to the first manufacturing device 10.

The power generation amount data supply unit 211 holds an actual value of the power generation amount for each past term and supplies the actual value to the calculation unit 202. The actual value of the power generation amount depends on an environment surrounding the power supply device 2. Therefore, the power generation amount data supply unit 211 can also hold environmental data for each past term in association with the actual value of the power generation amount and supply the environmental data to the calculation unit 202. When the power supply device 2 is a solar power generation facility, the environmental data includes data such as sunshine hours for each day, transition of the intensity of sunlight, transition of temperature, transition of humidity, and weather (sunshine, cloudiness, rain, and the like). Even when the power supply device 2 is other than the solar power generation facility, the environmental data includes data of a factor that affects the power supply amount by the power supply device 2.

The power generation amount data supply unit 211 also obtains (or holds) a predicted value of the power generation amount in the current term or a future term, and supplies the predicted value to the calculation unit 202. The power generation amount data supply unit 211 predicts the power generation amount of the power supply device 2 that varies every season (every month) on the basis of, for example, a correlation between past environmental data and data of an actual value of the power generation amount. The power generation amount data supply unit 211 may supply a predicted value of the power generation amount of the power supply device 2 based on a simulation result by the power generation simulator 216 to the calculation unit 202, if necessary. In addition, the power generation amount data supply unit 211 may acquire weather forecast data for a short period (several hours in a case of a short period) or a long period (several months or about one year in a case of a long period) from the outside or the like. In this case, the power generation amount data supply unit 211 can supply a predicted value of the power generation amount of the power supply device 2 based on the weather forecast data to the calculation unit 202.

The power generation simulator 216 simulates power generation on the basis of data supplied by the power generation amount data supply unit 211 (the above-described environmental data, weather forecast data, and the like) or the current environment (date, time, sunshine amount, temperature, and the like). The power generation simulator 216 can deliver a predicted value of the power generation amount, which is a simulation result, to the calculation unit 202 or the power generation amount data supply unit 211.

The power price data supply unit 221 supplies data of a price of power (unit price) in the market or the like to the calculation unit 202. The price of power here is, for example, a price when an operating company of the plant 1 sells the power. The price data is numerical data expressed in predetermined currency per unit amount of power. The power price data supply unit 221 may deliver data of the current price and a future price of power to the calculation unit 202. The future price may be a price of power in a futures market, or may be a future price predicted by the price data prediction model 226 described later.

Note that the data of the predicted value of the price of power supplied by the power price data supply unit 221 is updated at a predetermined frequency. For example, the data of the price (predicted value) of power is updated once every 10 minutes. However, the update frequency is not limited to the frequency exemplified here.

The product price data supply unit 222 supplies data of a price of a product (unit price) in the market or the like to the calculation unit 202. Here, the product includes the first product and the second product. The price of the product here is, for example, a price when an operating company of the plant 1 sells the first product or the second product. The price data is numerical data expressed in predetermined currency per unit amount of a substance. The product price data supply unit 222 may deliver data of the current price and a future price of the first product or the second product to the calculation unit 202. The future price may be a price of a product or the like in a futures market, or may be a future price predicted by the price data prediction model 226 described later.

Note that the data of the predicted value of the price of the first product or the second product supplied by the product price data supply unit 222 is updated at a predetermined frequency. For example, the data of the price (predicted value) of the first product or the second product is updated once a month. However, the update frequency is not limited to the frequency exemplified here.

The price data prediction model 226 is, for example, a machine-learned model or a machine-learnable model. The price data prediction model 226 predicts a future price of the price of power or the price of the product on the basis of input data. Data input for predicting the price of power may include, for example, data of the price of power for each past season, data of a price of fuel (such as crude oil), and an economic index (such as economic trend) related to a demand, but is not limited to those exemplified here. Data input for predicting the price of the product may include, for example, data of the price of the product for each past season and an economic index (such as economic trend) related to a demand of each product, but is not limited to those exemplified here. The price data prediction model 226 outputs a predicted value of a future price of power or a predicted value of a future price of the product according to a state of a learned model (a value of an internal parameter or the like) and input data. As a means for implementing the model itself by machine learning, for example, a neural network that is an existing technique can be used. The price data prediction model 226 can deliver the future value (predicted value) of the price of power obtained by the price data prediction model 226 itself to the calculation unit 202 and the power price data supply unit 221. In addition, the price data prediction model 226 can deliver the future value (predicted value) of the price of the product obtained by the price data prediction model 226 itself to the calculation unit 202 and the product price data supply unit 222.

Note that the method in which the price data prediction model 226 predicts the future price of power or the future price of the product using a machine learning method is an example. The plant control device 201 may predict the future price of power or the future price of the product using another method.

The storage amount data acquisition unit 228 acquires data of the amount of the first product stored in the storage device 20 (tank) at the current time from the storage device 20.

The actual supply amount storage unit 229 stores past actual data of the supply amount of the first product supplied to each of the second manufacturing device 40, the power generation device 50, and the sales means 60. The actual supply amount storage unit 229 stores the amount of the first product supplied to each of the devices and the like in association with a time axis (for example, for each term, for each day, or the like).

The parameter storage unit 230 stores a parameter value necessary for the plant control device 201 to operate. The parameter value stored in the parameter storage unit 230 can be rewritten by a predetermined procedure. That is, a behavior of the plant 1 can be appropriately controlled by rewriting the parameter value stored in the parameter storage unit

230. A specific parameter stored in the parameter storage unit 230 will be described later with reference to another drawing.

Next, specific control logic and the like by the plant control device 201 will be described. A plurality of types of control methods by the plant control device 201 are conceivable. Hereinafter, a control method in each of the plurality of cases will be described with reference to a flowchart and the like.

Figure 3:
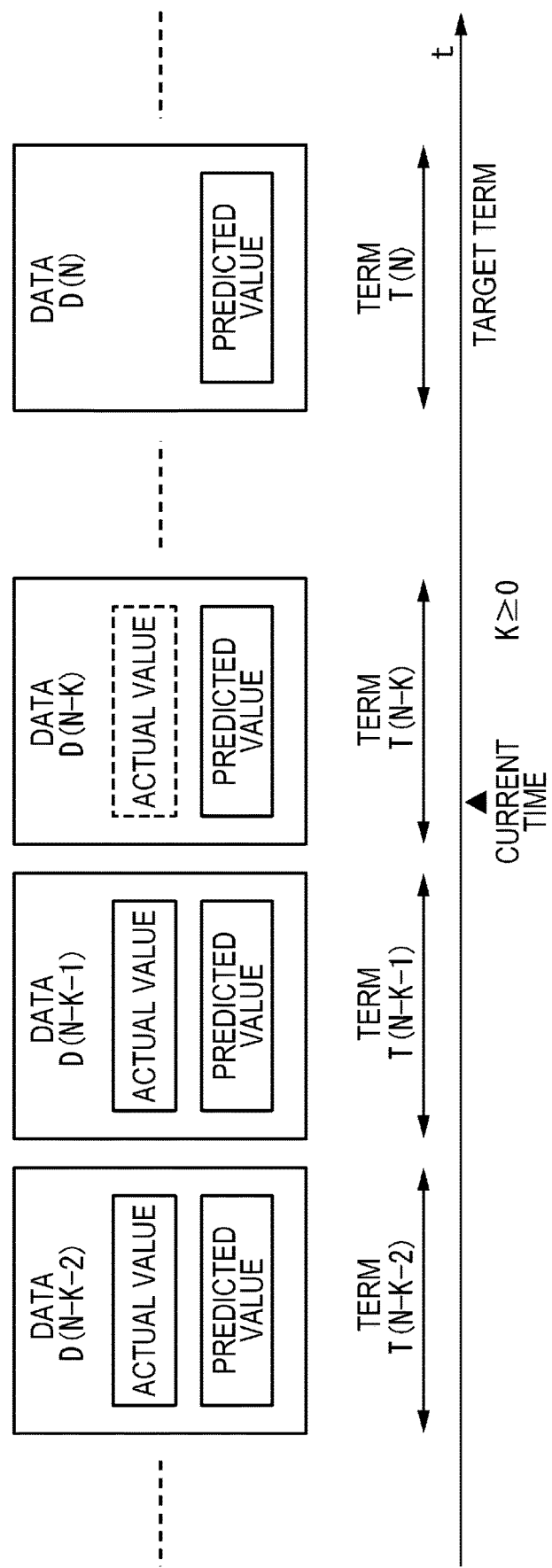
FIG. 3 is a schematic diagram illustrating a relationship between a term serving as a unit of control and data for each term in the first embodiment.

FIG. 3 is a schematic diagram illustrating a relationship between a term (period of time) and data common to the cases described below. FIG. 3 illustrates a series of terms arranged on a time axis. Each term is indexed with an integer value. In the illustrated example, a term T(N) is a term to be currently controlled. In FIG. 3, a term T(N−K−2), a term T(N−K−1), and a term T(N−K) are arranged from the left, a term T(N) is illustrated with a gap therefrom. Here, N and K are integers. The term T(N) to be controlled is referred to as a target term for convenience. Note that in FIG. 3, the current date and time is included in the term T(NK). Since the target term is a term including the current date and time or a future term, inevitably K≥0. As illustrated, there is data corresponding to each term. The data is also indexed with the same value as an index value of the term. That is, data related to the term T(N−K) is data D(N−K), data related to the term T(N) is data D(N), and the same applies to the other terms. Data of each term can include a predicted value and an actual value. However, needless to say, a future term (in the example of FIG. 3, the term T(N)) cannot include an actual value. Note that the data of each term may include a predicted value or does not have to include the predicted value. In addition, the data of each term may include an actual value or does not have to include the actual value.

Data of the predicted value may include a predicted value of a power generation amount supplied by the power generation amount data supply unit 211, a predicted value of a power generation amount obtained by the power generation simulator 216, a predicted value of the price of power supplied by the power price data supply unit 221, a predicted value of the price of the product supplied by the product price data supply unit 222, and a predicted value of the price of power or the price of the product predicted by the price data prediction model 226.

Data of the actual value may include an actual value of a power generation amount supplied by the power generation amount data supply unit 211, an actual value of the price of power supplied by the power price data supply unit 221, and an actual value of the price of the product supplied by the product price data supply unit 222. In addition, the data of the actual value may include data of a supply amount of the first product to each of the second manufacturing device 40, the power generation device 50, and the sales means 60 in each past term, stored in the actual supply amount storage unit 229. In addition, the data of the actual value may include data of the amount of the product or the power generation amount output from each of the second manufacturing device 40, the power generation device 50, and the sales means 60, stored in the actual supply amount storage unit 229.

Data regarding a term including the current time (in the example of FIG. 3, the term T(N−K)) may include an incomplete actual value. This is because an actual value of the term has not been completely found yet.

Regarding the data D(N) of the target term, a certain predicted value is required for control. The calculation unit 202 can access data of the target term and obtains a control value for controlling the plant 1 on the basis of the data of the target term.

A flow of control for each case based on the data as described above is as follows.

Case 1

As a basic idea in case 1, first, the manufacturing amount of the second product (for example, ammonia) is preferentially considered, and then distribution of applications of the remaining first product (for example, hydrogen) is considered. In other words, in case 1, continuous operation of the second manufacturing device is set as a top priority target.

Figure 4:
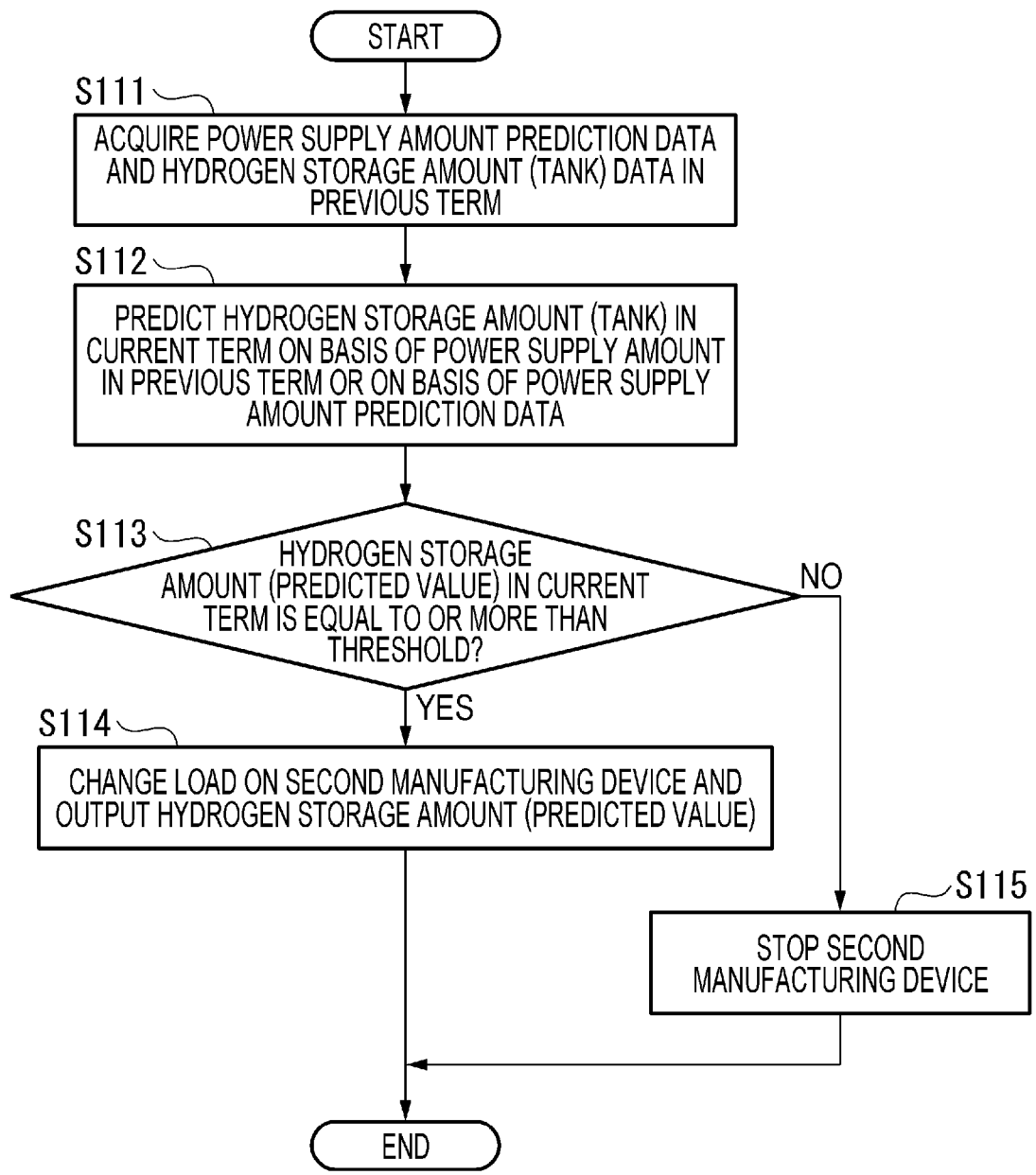
FIG. 4 is a first flowchart illustrating a processing procedure of the plant control device for control in case 1 in the first embodiment.

FIG. 4 is a first flowchart illustrating a processing procedure of the plant control device 201 for control in case 1. Hereinafter, description will be given with reference to this flowchart.

In step S111, the calculation unit 202 acquires power supply amount prediction data and data of the storage amount of the first product (hydrogen) in the previous term of the target term. Note that here, the power supply amount prediction data is a predicted value of the amount of power supplied from the power supply device 2 in the target term. In addition, the data of the storage amount of the first product in the previous term of the target term is measured by a measuring instrument included in the storage device 20. Alternatively, the storage amount of the first product may be obtained by reflecting the production amount or consumption amount of the first product on a measurement result by the measuring machine.

In step S112, the calculation unit 202 predicts the storage amount of the first product (hydrogen) in the target term (also referred to as the current term). Specifically, the calculation unit 202 predicts the storage amount of the first product in the target term on the basis of the storage amount of the first product in the previous term of the target term acquired in step S111. However, the calculation unit 202 calculates the manufacturing amount of the first product on the basis of the power supply amount (actual value or predicted value) in the previous term of the target term or on the basis of the power supply amount prediction data in a neighboring term of the target term, and as a result, predicts the storage amount of the first product in the target term.

In step S113, the calculation unit 202 determines whether or not the predicted value (calculated in step S112) of the storage amount of the first product in the target term (also referred to as the current term) is equal to or more than a predetermined threshold (LLL). Note that the value LLL is a lower limit value of a reference range of the first product in the storage device 20. If the predicted value of the storage amount of the first product is equal to or more than the threshold LLL (step S113: YES), the process proceeds to step S114. If the predicted value of the storage amount of the first product is less than the threshold LLL (step S113: NO), the process proceeds to step S115.

When the process proceeds to step S114, the calculation unit 202 determines an opening of the flow rate control valve 30 in order to change the supply amount of the first product to the second manufacturing device 40. In addition, the calculation unit 202 takes over the data of the predicted value of the storage amount of the first product to a process of FIG. 5 described next.

When the process proceeds to step S115, the plant control device 201 stops the second manufacturing device.

Figure 5:
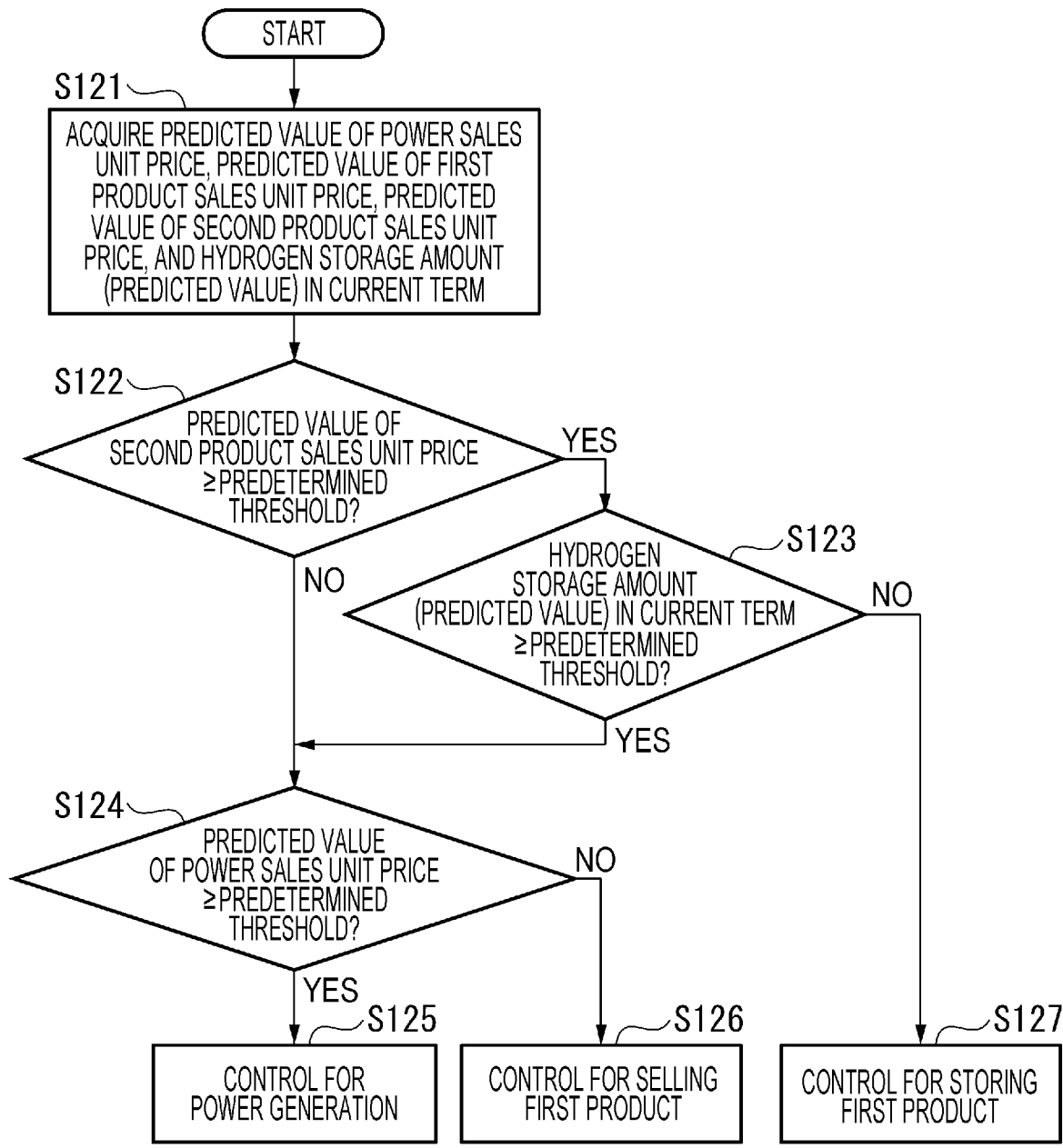
FIG. 5 is a second flowchart illustrating the processing procedure of the plant control device for control in case 1 in the first embodiment.

FIG. 5 is a second flowchart illustrating the processing procedure of the plant control device 201 for control in case 1. Hereinafter, description will be given with reference to this flowchart.

In step S121, the calculation unit 202 acquires a predicted value of a power sales price (unit price) in the target term (also referred to as the current term), a predicted value of a first product sales price (unit price), a predicted value of a second product sales price (unit price), and a hydrogen storage amount (predicted value) in the target term. Note that the hydrogen storage amount (predicted value) in the target term is a value obtained by the calculation unit 202 in step S114 in FIG. 4.

In step S122, the calculation unit 202 determines whether or not the predicted value of the second product sales price (unit price) acquired in S121 is equal to or more than a predetermined threshold (TH_NH3_PRICE). TH_NH3_PRICE is a threshold for the second product unit price. If the predicted value of the second product sales price (unit price) is equal to or more than TH_NH3_PRICE (step S122: YES), the process proceeds to step S123. If the predicted value of the second product sales price (unit price) is less than TH_NH3_PRICE (step S122: NO), the process proceeds to step S124.

When the process proceeds to step S123, the calculation unit 202 determines whether or not the storage amount (predicted value) of the first product in the storage device 20 in the target term (also referred to as the current term) is equal to or more than a predetermined threshold HHL. Note that the value HHL is an upper limit value of a reference range of the first product in the storage device 20. If the storage amount (predicted value) of the first product is equal to or more than the threshold HHL (step S123: YES), the process proceeds to step S124. If the storage amount (predicted value) of the first product is less than the threshold HHL (step S123: NO), the process proceeds to step S127.

When the process proceeds to step S124, the calculation unit 202 determines whether or not the predicted value of the power sales unit price in the target term is equal to or more than a threshold TH_ELE_PRICE. The threshold TH_ELE_PRICE is a reference value for determining whether or not sale of power is more advantageous than sale of the first product. If the predicted value of the power sales unit price in the target term is equal to or more than the threshold TH_ELE_PRICE (step S124: YES), the process proceeds to step S125. If the predicted value of the power sales unit price in the target term is less than the threshold TH_ELE_PRICE (step S124: NO), the process proceeds to step S126.

When the process proceeds to step S125, the calculation unit 202 performs control for using the surplus first product after the first product is allocated to manufacture of the second product for power generation. Specifically, the calculation unit 202 obtains the amount of the first product to be supplied to the second manufacturing device 40. In addition, the calculation unit 202 obtains the amount of the first product to be supplied to the power generation device 50 so as to generate power using the whole amount of the first product except for the amount to be supplied to the second manufacturing device 40. The calculation unit 202 controls throttle openings of the flow rate control valves 30, 31, and 32 on the basis of the respective obtained amounts.

When the process proceeds to step S126, the calculation unit 202 performs control for selling the surplus first product after the first product is allocated to manufacture of the second product. Specifically, the calculation unit 202 obtains the amount of the first product to be supplied to the second manufacturing device 40. In addition, the calculation unit 202 obtains the amount of the first product to be supplied to the sales facility 60 so as to sell the whole amount of the first product except for the amount to be supplied to the second manufacturing device 40. The calculation unit 202 controls throttle openings of the flow rate control valves 30, 31, and 32 on the basis of the respective obtained amounts.

When the process proceeds to step S127, the calculation unit 202 performs control for accumulating the surplus first product after the first product is allocated to manufacture of the second product in the storage device 20. Specifically, the calculation unit 202 performs control such that the opening of the flow rate control valve 30 is a predetermined value (a throttle opening according to a rated production amount of the second manufacturing device 40), thereby supplying a predetermined amount of the first product to the second manufacturing device 40. In addition, the calculation unit 202 performs control such that the opening of each of the flow rate control valves 31 and 32 is zero, and prevents the first product from being supplied to the power generation device 50 and the sales means 60.

As described above, in the control of case 1, the calculation unit 202 first determines the second supply amount, and then determines whether to make the third supply amount larger than the first supply amount or to make the first supply amount larger than the third supply amount on the basis of at least one of the first price and the third price. That is, the calculation unit 202 determines the first, second, and third supply amounts so as to further increase a revenue of the plant. Note that in the control of case 1, the calculation unit 202 may set the first supply amount to zero when the third supply amount is made larger than the first supply amount, or may set the third supply amount to zero when the first supply amount is made larger than the third supply amount.

In case 1, some thresholds for prices are used for determination as described above. These thresholds are appropriately read from the parameter storage unit 230 and used for determination. Note that these thresholds are determined as follows. In a first threshold determination method, a product unit price (cost) based on capital expenditure (CAPEX) and operational expenditure (OPEX) of a facility is calculated, and a price to which a predetermined percentage of profit is added is used as a threshold. In a second threshold determination method, a threshold is determined on the basis of past transition of a market price of a product or power by using a predetermined range of increase or decrease (both are percentage values) of the market price within a period of a predetermined length. For example, a reference value that can be regarded as an increase or a decrease of a statistically unique region on the basis of a standard deviation of a price variation or the like is used as a threshold.

Case 2

A basic idea in case 2 is to first consider what is generally profitable to manufacture (or power generation) and then reflect it on determination of a load for manufacturing the second product.

Figure 6:
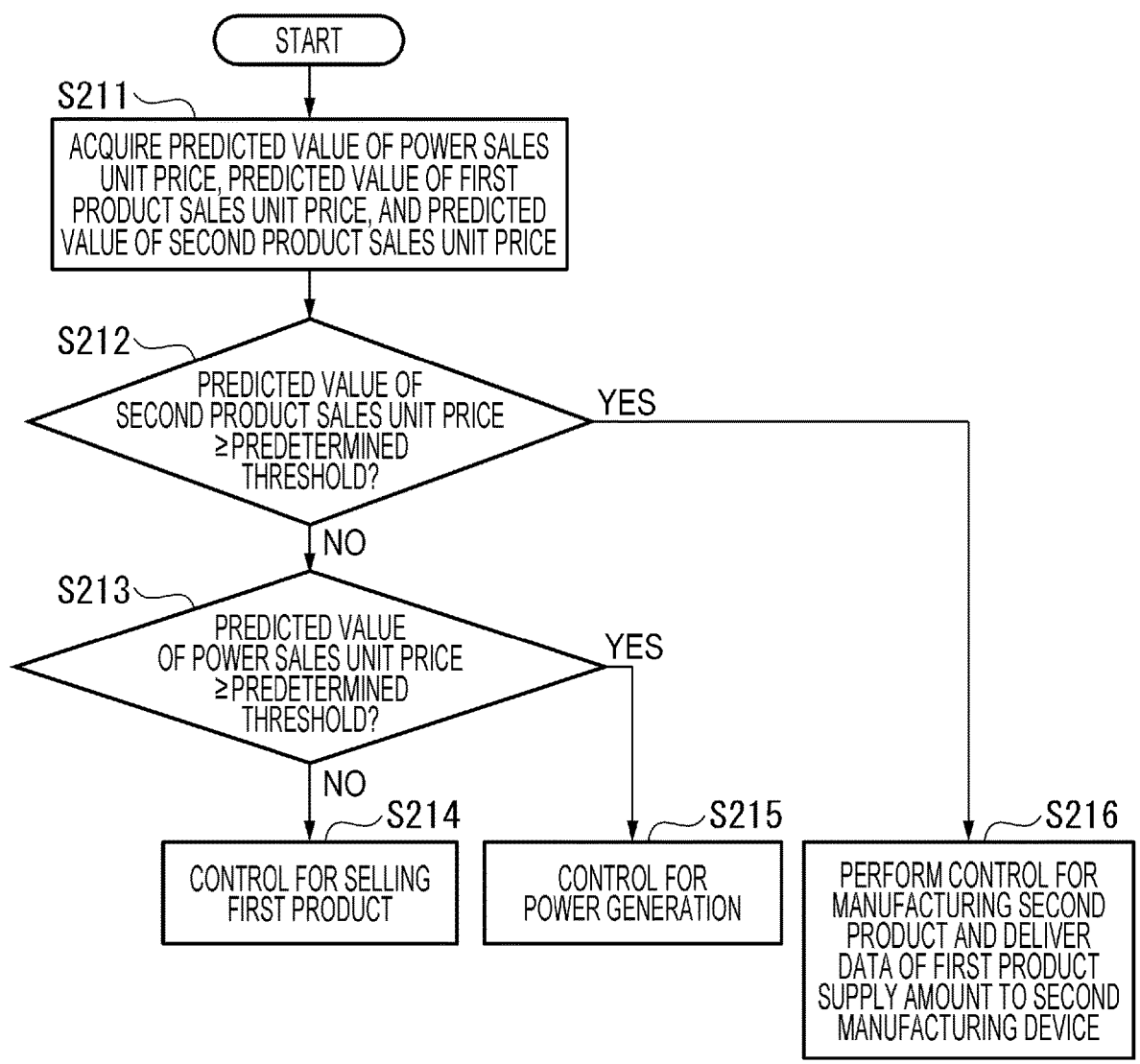
FIG. 6 is a first flowchart illustrating a processing procedure of the plant control device for control in case 2 in the first embodiment.

FIG. 6 is a first flowchart illustrating a processing procedure of the plant control device 201 for control in case 2. Hereinafter, description will be given with reference to this flowchart.

In step S211, the calculation unit 202 acquires data of a predicted value of a power sales price (unit price), a predicted value of a first product sales price (unit price), and a predicted value of a second product sales price (unit price). These predicted values are predicted values in the target term.

In step S212, the calculation unit 202 determines whether or not the predicted value of the second product sales price (unit price) acquired in S211 is equal to or more than a predetermined threshold TH_NH3_PRICE. This value TH_NH3_PRICE is a threshold for a price of the second product. If the predicted value of the second product sales price (unit price) is equal to or more than the threshold TH_NH3_PRICE (step S212: YES), the process proceeds to step S216. If the predicted value of the second product sales price (unit price) is less than the threshold TH_NH3_PRICE (step S212: NO), the process proceeds to step S213.

In step S213, the calculation unit 202 determines whether or not the predicted value of the power sales price (unit price) is equal to or more than a threshold TH_ELE_PRICE. This value TH_ELE_PRICE is a threshold for a price of power. If the predicted value of the power sales price (unit price) is equal to or more than the threshold TH_ELE_PRICE (step S213: YES), the process proceeds to step S215. If the predicted value of the power sales price (unit price) is less than the threshold TH_ELE_PRICE (step S213: NO), the process proceeds to step S214.

When the process proceeds to step S214, the calculation unit 202 performs control for selling the first product. Specifically, the calculation unit 202 performs control such that an opening of the flow rate control valve 32 is a predetermined value (for example, on the premise that the whole amount of the first product manufactured in the target term is sold, a throttle opening according to the sales amount), thereby supplying a predetermined amount of the first product to the sales means 60. In addition, the calculation unit 202 performs control such that an opening of each of the flow rate control valves 30 and 31 is zero, and prevents the first product from being supplied to the second manufacturing device 40 and the power generation device 50.

When the process proceeds to step S215, the calculation unit 202 performs control for generating power using the first product and selling the power obtained by the power generation. Specifically, the calculation unit 202 performs control such that the opening of the flow rate control valve 31 is a predetermined value (for example, on the premise that the whole amount of the first product manufactured in the target term is used for power generation, a throttle opening according to the manufacturing amount), thereby supplying a predetermined amount of the first product to the power generation device 50. In addition, the calculation unit 202 performs control such that the opening of each of the flow rate control valves 30 and 32 is zero, and prevents the first product from being supplied to the second manufacturing device 40 and the sales means 60.

When the process proceeds to step S216, the calculation unit 202 performs control for manufacturing the second product. In addition, the calculation unit 202 delivers data of a supply amount of the first product supplied to the second manufacturing device 40 for a process in FIG. 7. Specifically, the calculation unit 202 performs control such that the opening of the flow rate control valve 30 is a predetermined value (for example, a throttle opening corresponding to a supply amount of the first product according to an optimum manufacturing amount of the second product based on prediction in step S222 described later), thereby supplying a predetermined amount of the first product to the second manufacturing device 40. In addition, the calculation unit 202 performs control such that the opening of each of the flow rate control valves 31 and 32 is zero, and prevents the first product from being supplied to the power generation device 50 and the sales means 60.

Figure 7:
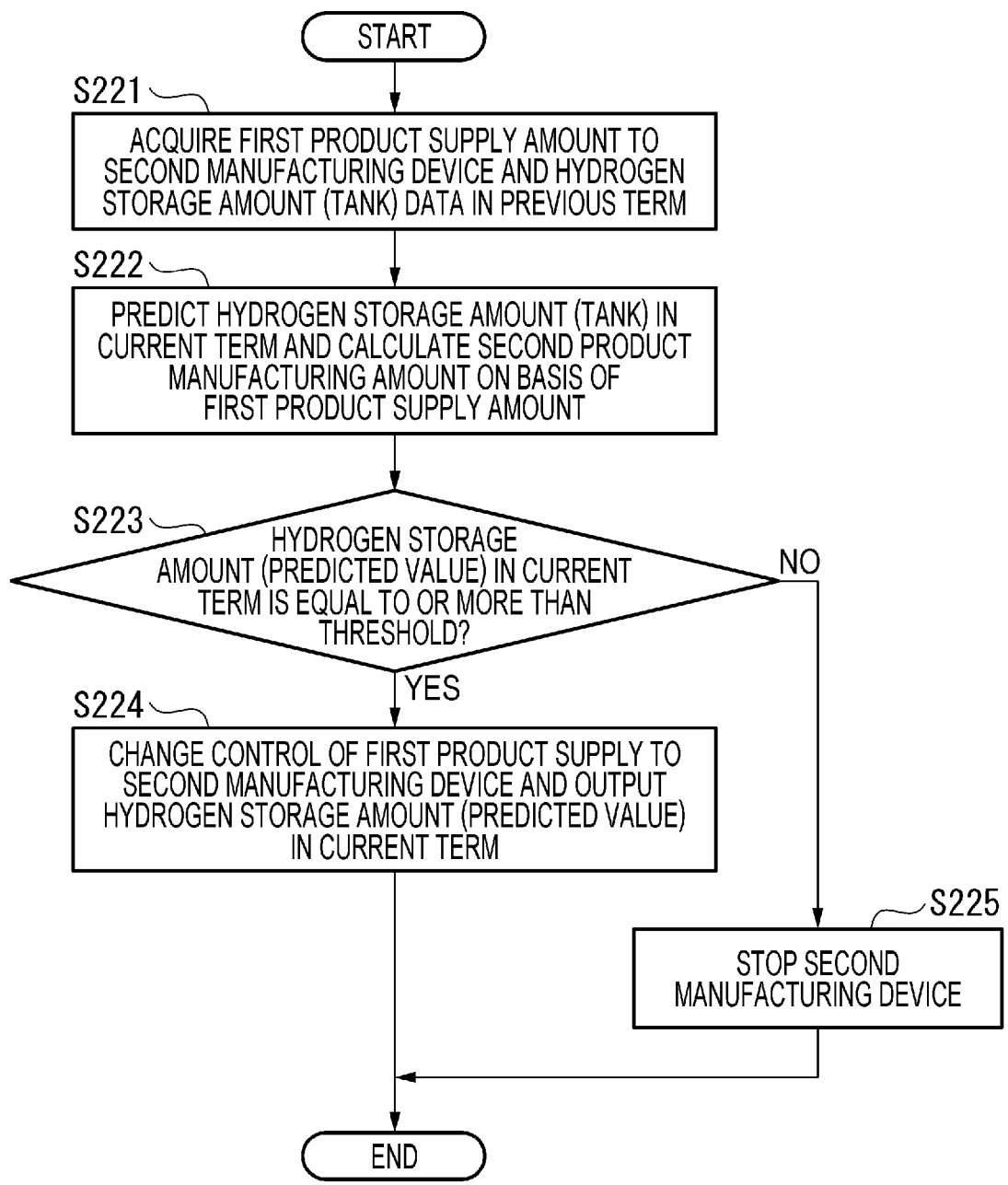
FIG. 7 is a second flowchart illustrating the processing procedure of the plant control device for control in case 2 in the first embodiment.

FIG. 7 is a second flowchart illustrating a processing procedure of the plant control device 201 for control in case 2. The process illustrated in FIG. 7 is performed only when step S216 is reached by conditional branching in the process illustrated in FIG. 6. Hereinafter, description will be given with reference to the flowchart in FIG. 7.

In step S221, the calculation unit 202 acquires the amount of the first product supplied to the second manufacturing device 40 and data of the storage amount in the storage device 20 in the previous term of the target term. Note that the amount of the first product supplied to the second manufacturing device 40 is data delivered in the process of step S216 in the flowchart of FIG. 6.

In step S222, the calculation unit 202 predicts the storage amount of the first product in the storage device 20 in the target term (also referred to as the current term). In addition, the calculation unit 202 calculates the manufacturing amount of the second product by the second manufacturing device in the target term on the basis of the amount of the first product supplied to the second manufacturing device 40, acquired in step S221. The storage amount of the first product in the storage device 20 in the target term is calculated on the basis of the storage amount in the previous term of the target term and the power supply amount (predicted value) from the power supply device 2 in the target term.

In step S223, the calculation unit 202 determines whether or not the storage amount of the first product in the storage device 20 in the target term (also referred to as the current term), which is a result of the prediction in step S222, is equal to or more than a predetermined threshold. The threshold here is a value LLL. The value LLL is a value corresponding to a lower limit of a reference range in the storage device 20. If the predicted storage amount of the first product in the storage device 20 is equal to or more than the threshold LLL (step S223: YES), the process proceeds to step S224. If the predicted storage amount of the first product in the storage device 20 is less than the threshold LLL (step S223: NO), the process proceeds to step S225.

When the process proceeds to step S224, the calculation unit 202 performs control such that the opening of the flow rate control valve 30 is changed to a predetermined value (for example, a throttle opening corresponding to the amount of the first product based on the manufacturing amount of the second product obtained in step S222), thereby changing the supply amount of the first product to the second manufacturing device 40 In addition, the calculation unit 202 outputs a predicted value of a hydrogen storage amount in the target term (also referred to as the current term).

When the process proceeds to step S225, the calculation unit 202 stops the operation of the second manufacturing device 40.

Note that a method for determining the threshold in case 2 may be similar to the method described in case 1.

As described above, in the control of case 2, when the second price is equal to or more than a predetermined reference value, the calculation unit 202 makes the second supply amount larger than the first supply amount and makes the second supply amount larger than the third supply amount. That is, the calculation unit 202 determines the first, second, and third supply amounts so as to further increase a revenue of the plant. Note that in the control of case 2, when the second price is equal to or more than a predetermined reference value, the calculation unit 202 may set the first supply amount to zero and the third supply amount to zero.

Case 3

In case 3, the calculation unit 202 obtains a supply amount of the first product to the second manufacturing device 40, a supply amount of the first product to the power generation device 50, and a supply amount of the first product to the sales means 60 such that a value of an evaluation function is improved (or optimized) under a given constraint condition.

Here, regarding the target term, the supply amount of the first product to the sales means 60 is represented by q1, the supply amount of the first product to the second manufacturing device 40 is represented by q2, and the supply amount of the first product to the power generation device 50 is represented by q3. A constraint condition related to q1, q2, and q3 is given by, for example, the following formulas (1) and (2).

$$q1 \geq 0, q2 \geq 0, q3 \geq 0 \quad (1)$$

$$Smin \leq q1 + q2 + q3 \leq Smax \quad (2)$$

However, Smin is a lower limit of the amount of the first product that can be supplied downstream (to a side of the second manufacturing device 40, the power generation device 50, and the sales means 60) from the storage device 20 in the target term. In addition, Smax is an upper limit of the amount of the first product that can be supplied downstream from the storage device 20 in the target term. Smin and Smax can be determined on the basis of the storage amount (actual value or predicted value) in the storage device 20 immediately before the target term, the power supply amount (usually, predicted value) from the power supply device 2 in the target term, and the reference range (lower limit and upper limit) of the storage amount in the storage device 20.

Note that the following formula (3) may be added as the constraint condition.

$$q2 \geq Lmin \quad (3)$$

However, Lmin is a lower limit of the amount of the first product to be supplied to the second manufacturing device 40. When the second manufacturing device 40 is a large-scale manufacturing plant and continuous operation of the second manufacturing device 40 is required, a value of Lmin is determined as an appropriate value.

An evaluation function under the constraint condition is defined by the following formula (4).

$$E = \alpha 1 \cdot q1 + \alpha 2 \cdot q2 + \alpha 3 \cdot q3$$

E is a value that the plant 1 generates in the target term. E may be, for example, sales, profit, or the like. Note that α1 is a value per unit supply amount of the first product, obtained by selling the first product. α2 is a value per unit supply amount of the first product, obtained by selling the second product. α3 is a value per unit supply amount of the first product, obtained by power generation. α1 depends on a unit price (for example, a predicted value) of the first product in the target term. α2 depends on a unit price (for example, a predicted value) of the second product in the target term. α3 depends on a unit price of power (for example, a predicted value) in the target term.

The calculation unit 202 determines values of q1, q2, and q3 such that an evaluation function value E is optimized or is a better value (larger value). In other words, the calculation unit 202 determines the values of q1, q2, and q3 on the basis of the evaluation function value E. Since E is expressed by a linear formula related to q1, q2, and q3, the calculation unit 202 can determine the values of q1, q2, and q3 by a simple procedure.

That is, in the control in case 3, the calculation unit 202 acquires data of the given first price, second price, and third price. Then, the calculation unit 202 obtains the first supply amount, the second supply amount, and the third supply amount such that the evaluation function value determined by the first supply amount (q1), the second supply amount (q2), and the third supply amount (q3) is a better value under a given constraint condition. In other words, the calculation unit 202 determines the first supply amount, the second supply amount, and the third supply amount on the basis of the evaluation function value.

FIG. 8 is a schematic diagram illustrating a configuration example of data stored in the parameter storage unit 230 of the plant control device 201. As illustrated, the parameter storage unit 230 stores a value for each parameter. In the illustrated example, the parameter storage unit 230 stores, for example, values of a lower limit of a reference range of the remaining amount in the storage device (label name: LLL), an upper limit of the reference range of the remaining amount in the storage device (label name: HHL), a determination reference value for a price (unit price) of ammonia (second product) (label name: TH_NH3_PRICE), and a determination reference value for a price (unit price) of power (label name: TH_ELE_PRICE). Note that the parameter storage unit 230 may further hold information of other parameters. The parameters exemplified here are those mentioned in the procedure for the above control. Values of the parameters are set by, for example, an administrator or the like of the plant 1. In the illustrated example, the lower limit of the reference range of the remaining amount in the storage device is set to 3000 [normal cubic meters], the upper limit of the reference range of the remaining amount in the storage device is set to 300,000 [normal cubic meters], the determination value for the price of ammonia is set to 500 [U.S. dollars/ton], and the determination value for the price of power is set to 0.13 [U.S. dollars/kilowatt-hour].

Modification

Here, a modification of the embodiment will be described. As illustrated in FIG. 1, in the above embodiment, the plant 1 includes both the power generation device 50 and the sales means 60. As a modification, the plant 1 may include only at least one of the power generation device 50 and the sales means 60. Note that at least one of the power generation device 50 and the sales means 60 included in the plant 1 may be referred to as "supply target facility" as a facility to which the first product is supplied.

In this case, when the plant 1 includes the sales means 60, the calculation unit 202 of the plant control device 201 acquires the first price that is a sales unit price of the first product. In addition, when the plant 1 includes the power generation device 50, the calculation unit 202 acquires the third price that is a sales unit price of power generated by the power generation device 50. That is, the calculation unit 202 acquires at least one (or more) of the first price that is a sales unit price of the first product, the second price that is a sales unit price of the second product, and the third price that is a sales unit price of power generated by the power generation device according to whether the plant 1 includes the power generation device 50 or the sales means 60.

In addition, when the plant 1 includes the sales means 60, the calculation unit 202 determines the first supply amount that is a supply amount of the first product to the sales means 60 on the basis of at least one of the first price, the second price, and the third price (among these prices, at least one of the first price, the second price, and the third price acquired by the calculation unit 202). In addition, when the plant 1 includes the power generation device 50, the calculation unit 202 determines the third supply amount that is a supply amount of the first product to the power generation device 50 on the basis of at least one of the first price, the second price, and the third price (among these prices, at least one of the first price, the second price, and the third price acquired by the calculation unit 202).

In addition, when the plant 1 includes the sales means 60, the control signal output unit 203 outputs a control signal such that the first product is supplied to the sales means 60 with the determined first supply amount. In addition, when the plant 1 includes the power generation device 50, the control signal output unit 203 outputs a control signal such that the first product is supplied to the power generation device 50 with the determined third supply amount.

An example of a plant control method in this modification is as follows. That is, the calculation unit 202 first determines a supply amount (second supply amount) of the first product to the second manufacturing device 40. Thereafter, the calculation unit 202 performs the following control. When the plant 1 includes the sales means 60, the calculation unit 202 determines to supply the first product to the sales means 60, and as a result, determines a supply amount (first supply amount) of the first product to the sales means 60 as a value larger than 0. When the plant 1 includes the power generation device 50, the calculation unit 202 determines to supply the first product to the power generation device 50, and as a result, determines a supply amount (third supply amount) of the first product to the power generation device 50 as a value larger than 0.

In addition, an example of a more detailed plant control method in this modification is as follows.

When the plant 1 does not include the power generation device 50, it is not necessary to perform the determination in step S124 in the flowchart illustrated in FIG. 5. That is, the process necessarily proceeds to the process in step S126 without performing the determination in step S124.

Conversely, when the plant 1 does not include the sales means 60, it is not necessary to perform the determination in step S124 in the flowchart illustrated in FIG. 5. That is, the process necessarily proceeds to the process in step S125 without performing the determination in step S124.

When the plant 1 does not include the power generation device 50, it is not necessary to perform the determination in step S213 in the flowchart illustrated in FIG. 6. That is, the process necessarily proceeds to the process in step S214 without performing the determination in step S213.

Conversely, when the plant 1 does not include the sales means 60, it is not necessary to perform the determination in step S213 in the flowchart illustrated in FIG. 6. That is, the process necessarily proceeds to the process in step S215 without performing the determination in step S213.

That is, in "case 2", when the second price is equal to or more than the predetermined reference value, the calculation unit 202 makes the second supply amount larger than the supply amount of the first product to the supply target facility. In addition, in "case 2", when the second price is equal to or more than the predetermined reference value, the calculation unit 202 may set the supply amount of the first product to the supply target facility to zero.

In addition, in the above-described "case 3", when at least two of the first price, the second price, and the third price are given, the calculation unit 202 may obtain the second supply amount and the supply amount of the first product to the supply target facility on the basis of a predetermined evaluation function value determined by the at least two of the first supply amount, the second supply amount, and the third supply amount under a given constraint condition.

In other words, depending on whether the plant 1 includes the power generation device 50 or the sales means 60, a value of an evaluation function may be calculated assuming that there is no unnecessary term among the terms included in the above formula (4). That is, formula (4) may be replaced with either of the following formulas.

$$E = \alpha 1 \cdot q1 + \alpha 2 \cdot q2$$

$$E = \alpha 2 \cdot q2 + \alpha 3 \cdot q3$$

Note that at least a part of the function of the plant control device in the above-described embodiment (including the modification) can be implemented by a computer. In this case, the function may be implemented by recording a program for implementing the function in a computer-readable recording medium, and allowing the program recorded in the recording medium to be read and executed by a computer system. Note that the term "computer system" here includes OS and hardware such a peripheral device. In addition, the term "computer-readable recording medium" refers to a portable medium such as a flexible disk, a magneto-optical disk, ROM, CD-ROM, DVD-ROM, or a USB memory; or a storage device built in a computer system, such as a hard disk. Furthermore, the term "computer-readable recording medium" may include one that temporarily and dynamically holds a program, such as a network including the Internet or a communication line that is used when a program is transmitted via a communication line such as a telephone line, and one that holds a program for a certain period of time, such as an internal volatile memory in a computer system that serves as a server or a client used when the program is transmitted via the network or the communication line. In addition, the above program may be a program for implementing a part of the above-described function, or a program that can implement the above-described function in combination with a program that has already been recorded in a computer system.

According to the embodiment (or the modification thereof) described above, the plant control device 201 performs control to change the supply amount of the first product to the second manufacturing device 40, the power generation device 50, or the sales means 60 according to a variation in the price of the first product, the price of the second product, or the price of power. With such a configuration of the present embodiment, it is possible to perform control for further increasing a revenue due to the operation of the plant 1.

Second Embodiment

Next, a second embodiment will be described. Note that description of the matters described in the previous embodiment may be omitted here. Here, matters specific to the present embodiment will be mainly described.

Figure 9:
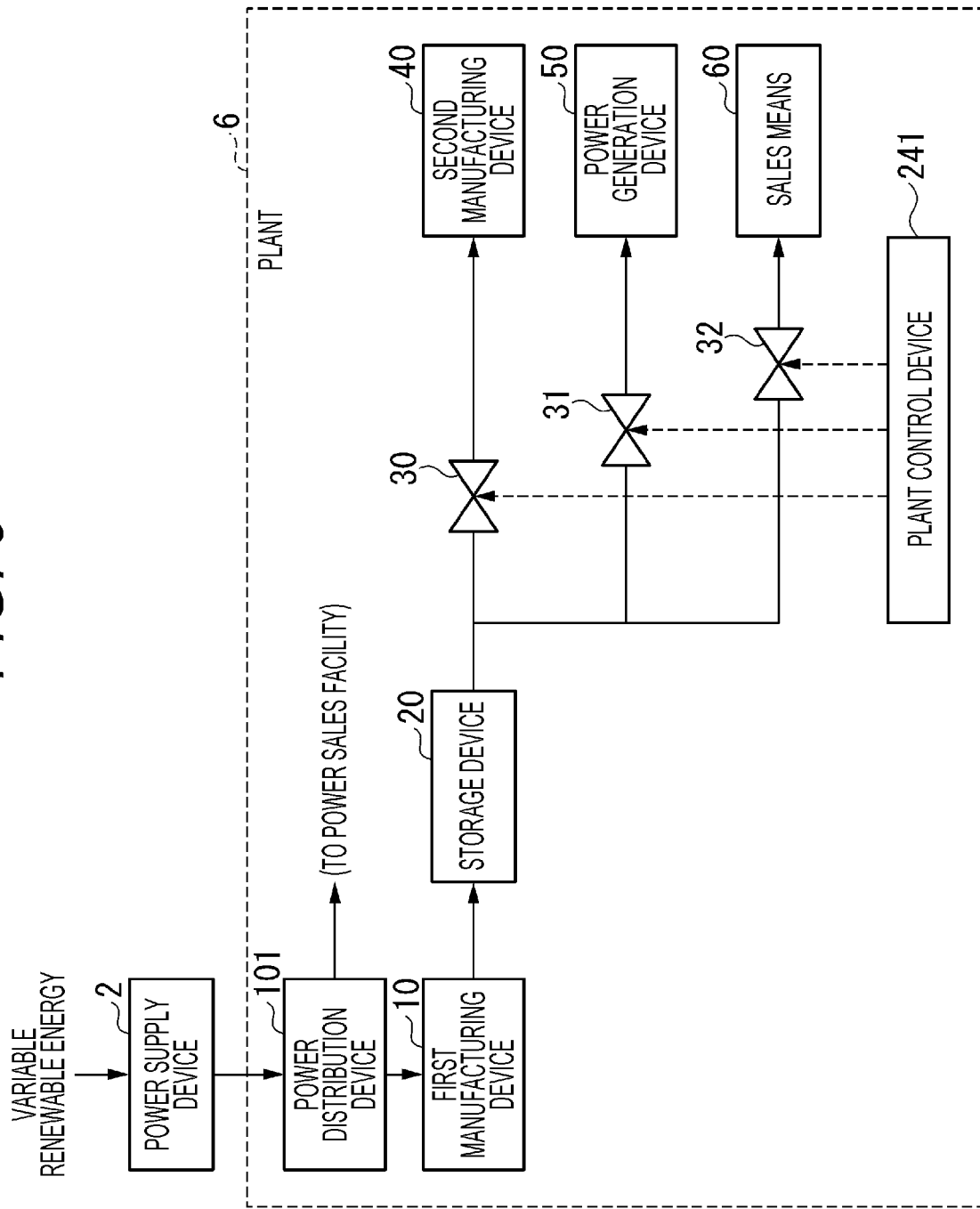
FIG. 9 is a block diagram illustrating a configuration of a plant according to a second embodiment.

FIG. 9 is a block diagram illustrating a configuration of a plant according to the present embodiment. As illustrated, a plant 6 according to the present embodiment includes a first manufacturing device 10, a storage device 20, flow rate control valves 30, 31, and 32, a second manufacturing device 40, a power generation device 50, a sales means 60, a plant control device 241, and a power distribution device 101. The present embodiment is characterized in that the plant 6 includes the power distribution device 101.

The power distribution device 101 distributes power supplied by the power supply device 2. Specifically, the power distribution device 101 distributes power to the first manufacturing device 10 and a power sales facility. The power distribution device 101 can supply power to both the first manufacturing device 10 and the power sales facility or can supply power only to one of the first manufacturing device 10 and the power sales facility at a certain point of time.

The power sales facility is a facility for selling power to the outside. The power sales facility may be, for example, a facility for power transmission or a facility for power storage.

The plant control device 241 in the present embodiment has a function similar to that of the plant control device 201 described in the first embodiment. Furthermore, the plant control device 241 controls the power distribution device 101. That is, the plant control device 241 can control whether the power distribution device 101 supplies power only to the first manufacturing device 10, supplies power only to the power sales facility, or supplies power to both the first manufacturing device 10 and the power sales facility.

In the present embodiment, the plant control device 241 performs the following control. The calculation unit 202 included in the plant control device 241 acquires a fourth price that is a sales unit price of power supplied from the power supply device 2 from an external device or the like via, for example, a communication line. Then, the calculation unit 202 determines a sales power supply amount that is a supply amount of power to the power sales facility on the basis of at least the fourth price. Then, the control signal output unit 203 outputs a control signal such that power is supplied from the power distribution device 101 to the power sales facility at the sales power supply amount determined above.

Next, two cases for determining the sales power supply amount will be described.

In case 1, operation of the second manufacturing device 40 is prioritized. That is, the first product necessary for operating the second manufacturing device 40 is manufactured by the first manufacturing device 10. Then, on the basis of the fourth price, it is determined whether to supply a margin of power supplied from the power supply device 2 to the power sales facility or to supply the margin of the power to the first manufacturing device 10 for further manufacturing the first product. That is, when the fourth price is equal to or more than a predetermined threshold, the margin of the power is supplied to the power sales facility. Conversely, when the fourth price is less than the predetermined threshold, the margin of the power is supplied to the first manufacturing device 10.

In case 2, any one of manufacture of the first product, manufacture of the second product, and sale of power is selected with reference to the first price, the second price, the third price, and the fourth price such that a maximum revenue (profit) is obtained on the basis of power supplied from the power supply device 2.

Modification

Also in the second embodiment, the plant 6 may include only at least one of the power generation device 50 and the sales means 60 as a supply target facility. The calculation unit 202 acquires at least one of the first price and the third price depending on which supply target facility the plant 6 includes. Then, the calculation unit 202 determines the sales power supply amount that is a supply amount of power to the power sales facility on the basis of the acquired at least one of the first price, the second price, the third price, and the fourth price.

Third Embodiment

Next, a third embodiment will be described. Note that description of the matters described in the previous embodiments may be omitted here. Here, matters specific to the present embodiment will be mainly described.

Figure 10:
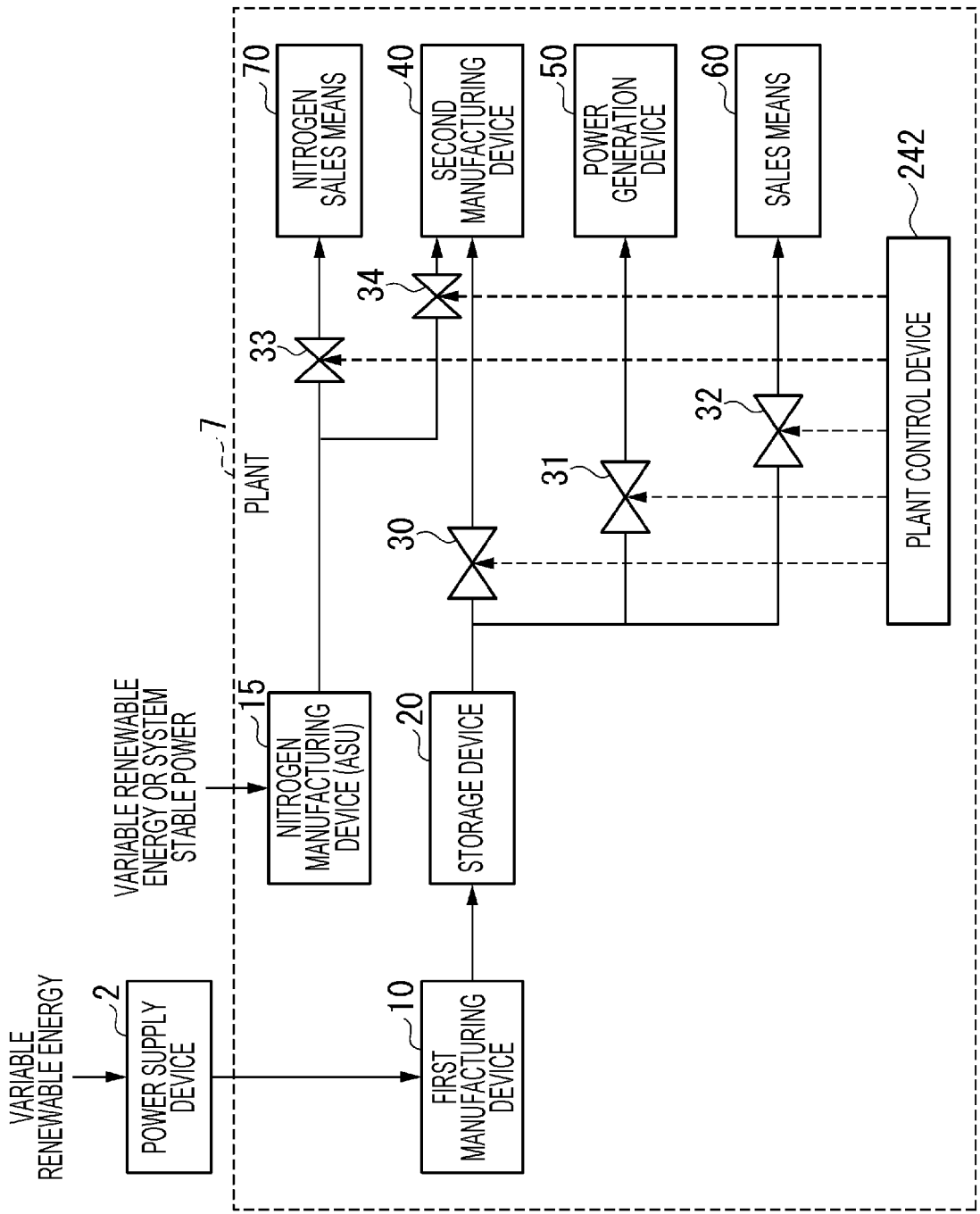
FIG. 10 is a block diagram illustrating a configuration of a plant according to a third embodiment.

FIG. 10 is a block diagram illustrating a configuration of a plant according to the present embodiment. As illustrated, a plant 7 according to the present embodiment includes a first manufacturing device 10, a nitrogen manufacturing device 15, a storage device 20, flow rate control valves 30, 31, 32, 33, and 34, a second manufacturing device 40, a power generation device 50, a sales means 60, a nitrogen sales means 70, and a plant control device 242. The present embodiment is characterized in that the plant 7 includes the nitrogen manufacturing device 15 and the nitrogen sales means 70.

Note that in the present embodiment, a first product manufactured by the first manufacturing device 10 is hydrogen. That is, the first manufacturing device 10 manufactures hydrogen ($H_2$) and oxygen ($O_2$) by electrolyzing water ($H_2O$). In addition, a second product manufactured by the second manufacturing device 40 is ammonia ($NH_3$). That is, the second manufacturing device 40 manufactures ammonia using hydrogen manufactured by the first manufacturing device 10 and nitrogen ($N_2$) manufactured by the nitrogen manufacturing device 15.

In the present embodiment, nitrogen manufactured by the nitrogen manufacturing device 15 can be used for manufacturing ammonia, or nitrogen itself manufactured by the nitrogen manufacturing device 15 can be sold to an external business operator or the like.

The nitrogen manufacturing device 15 manufactures nitrogen using variable renewable energy (power) or system stable power. Specifically, the nitrogen manufacturing device 15 manufactures nitrogen by separating nitrogen contained in the air. That is, the nitrogen manufacturing device 15 is an air separation unit (ASU). The nitrogen manufacturing device 15 may separate nitrogen in the air by a method such as cryogenic separation, membrane separation, pressure swing adsorption (PSA), or thermal swing adsorption (TSA). However, the method by which the nitrogen manufacturing device 15 manufactures nitrogen is not limited to those exemplified here. Nitrogen manufacture by the nitrogen manufacturing device 15 can be supplied to the second manufacturing device 40 and the nitrogen sales means 70.

The nitrogen sales means 70 is a facility, a device, or the like for selling nitrogen manufactured by the nitrogen manufacturing device 15. The nitrogen sales means 70 may be, for example, a storage device (a tank or the like) for storing nitrogen for sale, a pipeline or the like for supplying nitrogen to another place, or a facility for loading nitrogen on a transportation means (a ship, a truck, or the like, but not limited thereto). In other words, the nitrogen sales means 70 may be, for example, any one of a tank for storing nitrogen, a pipe for supplying nitrogen to another plant of a sales destination, and a pipe for loading nitrogen on a transportation means. In addition, the nitrogen sales means 70 may be a means other than the facility and the device exemplified here.

Each of the flow rate control valves 33 and 34 is a valve for controlling a flow rate of nitrogen supplied from the nitrogen manufacturing device 15. The flow rate control valve 33 is disposed on a route of, for example, a pipe for supplying nitrogen from the nitrogen manufacturing device 15 to the nitrogen sales means 70. The flow rate control valve 34 is disposed on a route of, for example, a pipe for supplying nitrogen from the nitrogen manufacturing device 15 to the second manufacturing device 40. Each of the flow rate control valves 33 and 34 includes, for example, a mechanism that can steplessly change a throttle opening. The throttle opening of each of the flow rate control valves 33 and 34 can be changed on the basis of a control signal from the plant control device 242.

The plant control device 242 in the present embodiment has a function similar to that of the plant control device 201 described in the first embodiment. Furthermore, the plant control device 242 controls each of the flow rate control valves 33 and 34. That is, the plant control device 242 can control a flow rate (supply amount per unit time) of nitrogen to each of the nitrogen sales means 70 and the second manufacturing device 40. In addition, the plant control device 242 can acquire a signal for grasping an operation situation (an operation margin and the like) of the nitrogen manufacturing device 15 and can control operation of the nitrogen manufacturing device 15.

The plant control device 242 determines and controls a supply amount of nitrogen to each of the nitrogen sales means 70 and the second manufacturing device 40 as follows. That is, as described above, the second manufacturing device 40 in the present embodiment is a device that manufactures ammonia, and the amount of nitrogen to be supplied to the second manufacturing device 40 can be automatically determined according to a load of the second manufacturing device 40. Then, when a manufacturing capacity of the nitrogen manufacturing device 15 further has a margin (operation margin) and a sales price of nitrogen is higher than a predetermined threshold, a load of the nitrogen manufacturing device 15 can be increased. That is, in such a case, the plant control device 242 performs control so as to increase the load of the nitrogen manufacturing device 15, and performs control so as to supply nitrogen manufacture by controlling the throttle opening of the flow rate control valve 33 to the nitrogen sales means 70.

Figure 11:
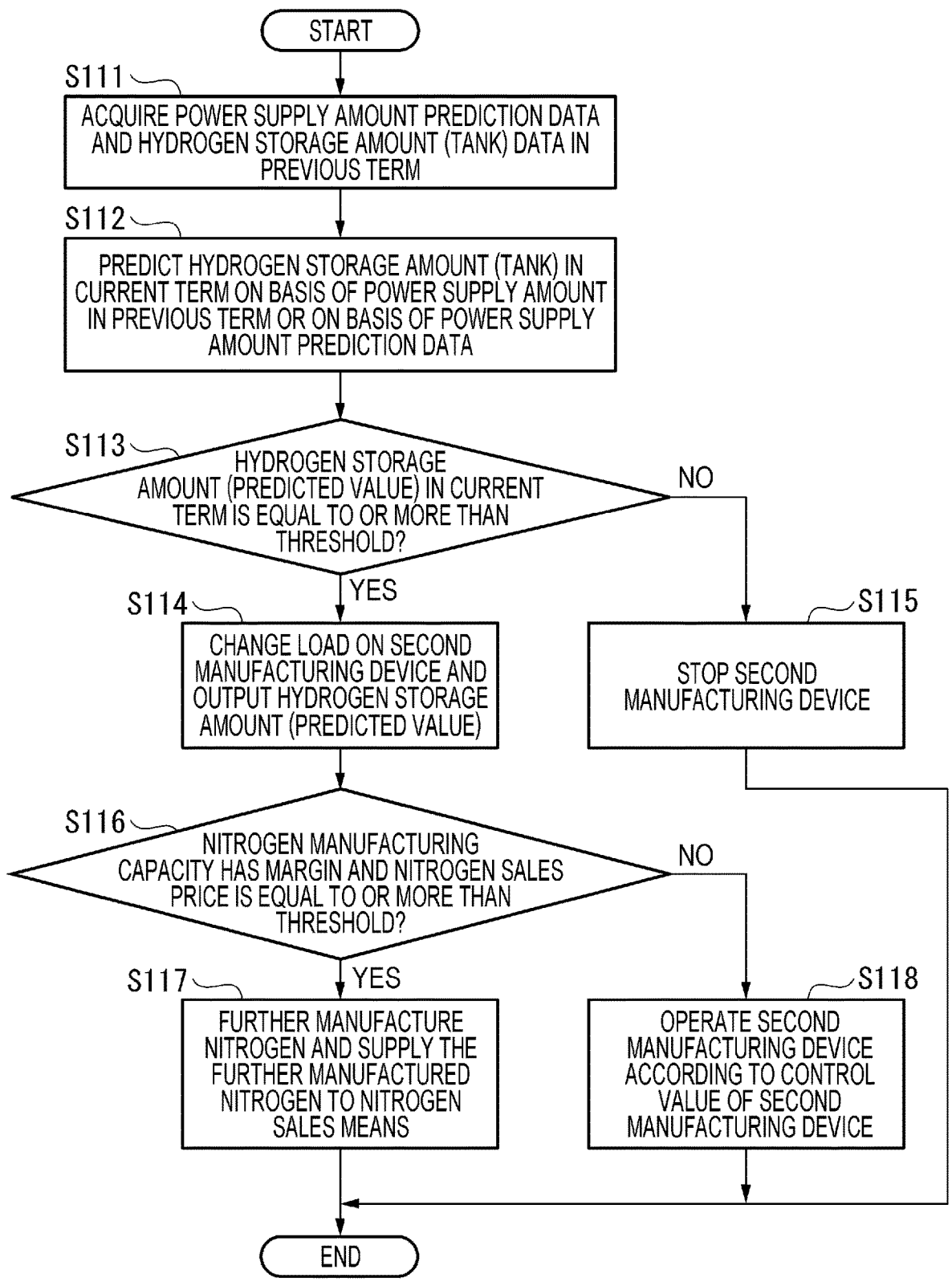
FIG. 11 is a first flowchart illustrating a processing procedure of a plant control device for control in case 1 in the third embodiment.
Figure 12:
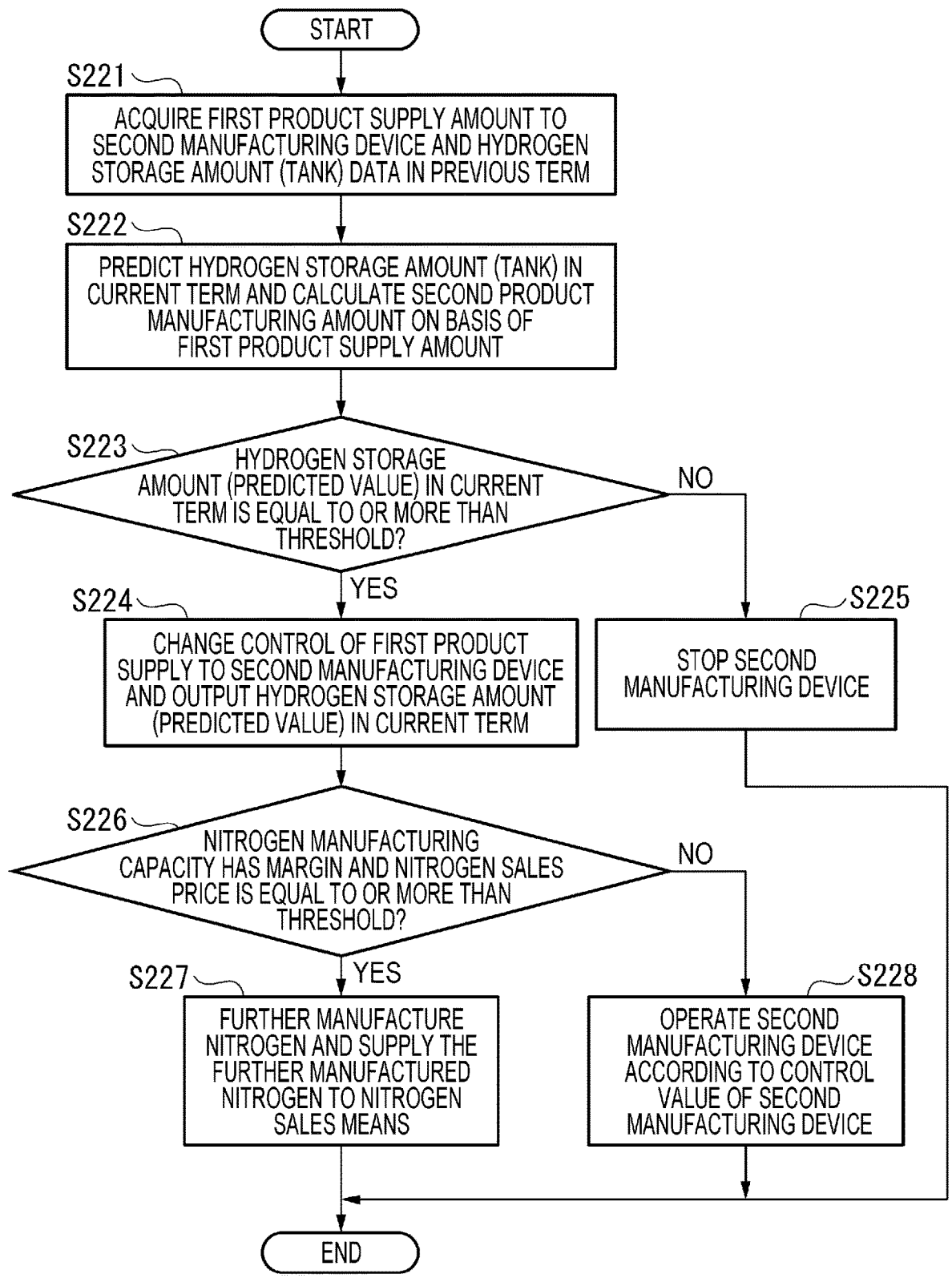
FIG. 12 is a second flowchart illustrating the processing procedure of the plant control device for control in case 2 in the third embodiment.

A flow of control by the plant control device 242 in the present embodiment will be described with reference to a flowchart. FIG. 11 is a flowchart corresponding to FIG. 4 (first flowchart for control in case 1) in the first embodiment. In addition, FIG. 12 is a flowchart corresponding to FIG. 7 (second flowchart for control in case 2) in the first embodiment. Hereinafter, description will be given with reference to each of FIGS. 11 and 12.

Steps S111 to S115 in FIG. 11 are similar to the processes already described with reference to FIG. 4.

After step S114 in FIG. 11, the process proceeds to step S116. In step S116, the calculation unit 202 in the plant control device 242 determines whether or not a nitrogen manufacturing capacity of the nitrogen manufacturing device 15 has a margin and a nitrogen sales price is equal to or more than a predetermined threshold. If the nitrogen manufacturing capacity of the nitrogen manufacturing device 15 has a margin and the nitrogen sales price is equal to or more than the predetermined threshold (step S116: YES), the process proceeds to step S117. Otherwise (step S116: NO), the process proceeds to step S118.

When the process proceeds to step S117, the plant control device 242 performs control so as to further manufacture nitrogen and supply the further manufactured nitrogen to the nitrogen sales means 70. That is, the plant control device 242 controls the operation of the nitrogen manufacturing device 15 as described above. In addition, the plant control device 242 controls the throttle opening of the flow rate control valve 33 such that a predetermined amount of nitrogen for sale that has been further manufactured is supplied to the nitrogen sales means 70.

When the process proceeds to step S118, the plant 6 operates the second manufacturing device 40 according to a control value of the second manufacturing device 40. That is, the plant control device 242 controls the operation of the nitrogen manufacturing device 15 and the throttle opening of each of the flow rate control valves 33 and 34 as described above.

Next, a flow of FIG. 12 will be described. Steps S221 to S225 in FIG. 12 are similar to the processes already described with reference to FIG. 7.

After step S224 in FIG. 12, the process proceeds to step S226. In step S226, the calculation unit 202 in the plant control device 242 determines whether or not a nitrogen manufacturing capacity of the nitrogen manufacturing device 15 has a margin and a nitrogen sales price is equal to or more than a predetermined threshold. If the nitrogen manufacturing capacity of the nitrogen manufacturing device 15 has a margin and the nitrogen sales price is equal to or more than the predetermined threshold (step S226: YES), the process proceeds to step S227. Otherwise (step S226: NO), the process proceeds to step S228.

When the process proceeds to step S227, the plant control device 242 performs control so as to further manufacture nitrogen and supply the further manufactured nitrogen to the nitrogen sales means 70. That is, the plant control device 242 controls the operation of the nitrogen manufacturing device 15 as described above. In addition, the plant control device 242 controls the throttle opening of the flow rate control valve 33 such that a predetermined amount of nitrogen for sale that has been further manufactured is supplied to the nitrogen sales means 70.

When the process proceeds to step S228, the plant 6 operates the second manufacturing device 40 according to a control value of the second manufacturing device 40. That is, the plant control device 242 controls the operation of the nitrogen manufacturing device 15 and the throttle opening of each of the flow rate control valves 33 and 34 as described above.

As described above, the plant 6 of the present embodiment can manufacture nitrogen other than the amount to be supplied to the second manufacturing device 40 and sell the nitrogen according to a situation such as the sales price of nitrogen or the operation margin of the nitrogen manufacturing device 15. That is, in the present embodiment, a revenue of the plant can be further improved.

Note that in each of the embodiments, control based on a sales price (sales unit price) is performed. Here, the sales price (sales unit price) includes a sales price (sales unit price) of the first product, a sales price (sales unit price) of the second product, a nitrogen sales price (nitrogen sales unit price) that is a sales price of nitrogen, and a sales price (sales unit price) of power. The plant control device 241 according to each of the embodiments acquires information regarding the sales price (sales unit price) from an external device or the like via a communication line (the Internet or the like). The sales price (sales unit price) may be, for example, a transaction value (selling value) or an indicative price (a bid price or the like) of an actual product or futures in the market, or may be a price (unit price) presented by a specific transaction partner (for example, a relative transaction partner). In addition, the sales price (sales unit price) may be a price (unit price) or the like for reference.

Note that the plurality of embodiments described above may be implemented in combination when the embodiments can be combined. For example, the configuration of the second embodiment and the configuration of the third embodiment may be combined and implemented.

Although the plurality of embodiments (including the modifications) of the present invention have been described in detail with reference to the drawings, the specific configuration of the present invention is not limited to the embodiments, and includes a design and the like within a range not departing from the gist of the present invention.

INDUSTRIAL APPLICABILITY

The present invention can be used in a manufacturing plant or the like utilizing variable renewable energy. However, the use range of the present invention is not limited to the range exemplified here.

The invention claimed is:

1. A plant control method for controlling a plant including:
   a storage device that receives and stores a manufactured first product from a first manufacturing device that manufactures the first product using power supplied from a power supply device that supplies power generated using variable renewable energy;
   a second manufacturing device that manufactures a second product using the first product supplied from the storage device; and
   a supply target facility of at least one of a power generation device and a sales device, wherein
   the power generation device generates power using the first product supplied from the storage device,
   the sales device supplies the first product supplied from the storage device to an outside for sale,
   wherein the plant control method comprises:
   determining a lower limit and an upper limit of a supplyable amount of the first product that can be supplied from the storage device, based on a storage amount of the first product in the storage device immediately before a target term to be controlled, the amount of the power supplied from the power supply device in the target term, and a reference range of the storage amount of the first product in the storage device,
   determining a lower limit of a second supply amount, which is a supply amount of the first product to the second manufacturing device, that allows the second manufacturing device to operate continuously, and
   calculating a first supply amount that is a supply amount of the first product to the sales device, the second supply amount, and a third supply amount that is a supply amount of the first product to the power generation device such that an aggregated value is maximized while satisfying a condition including the determined lower and upper limits of the supplyable amount of the first product and the determined lower limit of the second supply amount, by using an evaluation function which calculates the aggregated value by multiplying the first supply amount, the second supply amount, and the third supply amount by respective coefficients,
   outputting a control signal, by a control signal output circuitry, to a flow rate control valve that controls a flow rate of the first product to a supply destination; and
   controlling the flow rate control valve, by the control signal output circuitry, based on the output control signal, to change a throttle opening of the flow rate control valve to supply the first product, such that the first product is supplied to the second manufacturing device at the determined second supply amount, the first product is supplied to the sales device at the determined first supply amount in a case where the plant includes the sales device, and the first product is supplied to the power generation device at the determined third supply amount in a case where the plant includes the power generation device.

2. The plant control method according to claim 1, wherein the calculating includes:
   first determining the second supply amount, and then,
   in a case where the plant includes the sales device, determining to supply the first product to the sales device and determining the first supply amount as a value larger than 0, and
   in a case where the plant includes the power generation device, determining to supply the first product to the power generation device and determining the third supply amount as a value larger than 0.

3. The plant control method according to claim 1, wherein the plant includes the sales device and the power generation device.

4. The plant control method according to claim 3, wherein the calculating includes:
   first determining the second supply amount, and then determining whether to make the third supply amount larger than the first supply amount or to make the first supply amount larger than the third supply amount on a basis of at least one of a first price that is a sales unit price of the first product and a third price that is a sales unit price of power generated by the power generation device.

5. The plant control method according to claim 4, wherein the calculating includes:
   setting the first supply amount to zero in a case where the third supply amount is made larger than the first supply amount, or setting the third supply amount to zero in a case where the first supply amount is made larger than the third supply amount.

6. The plant control method according to claim 1, wherein the calculating includes:
   in a case where a second price that is a sales unit price of the second product is equal to or more than a predetermined reference value, making the second supply amount larger than a supply amount of the first product to the supply target facility.

7. The plant control method according to claim 6, wherein the calculating includes:
in a case where a second price is equal to or more than a predetermined reference value, setting the supply amount of the first product to the supply target facility to zero.

8. The plant control method according to claim 1, wherein the calculating includes:
in a case where at least two of a first price that is a sales unit price of the first product, a second price that is a sales unit price of the second product, and a third price that is a sales unit price of power generated by the power generation device are given, obtaining the second supply amount and a supply amount of the first product to the supply target facility on a basis of a predetermined evaluation function value determined by the at least two of the first supply amount, the second supply amount, and the third supply amount under a given constraint condition.

9. The plant control method according to claim 1, wherein the sales device is any one of a tank for storing the first product, a pipe for supplying the first product to another plant of a sales destination, and a pipe for loading the first product on a transportation device.

10. The plant control method according to claim 1, wherein
the plant further includes
a power distribution device that distributes power supplied from the power supply device to the first manufacturing device and a power sales facility for selling power,
wherein the plant control method further comprises:
acquiring a fourth price that is a sales unit price of power supplied from the power supply device,
determining a sales power supply amount that is a supply amount of power to the power sales facility on a basis of the acquired at least one of a first price that is a sales unit price of the first product, a second price that is a sales unit price of the second product, a third price that is a sales unit price of power generated by the power generation device, and the fourth price, and
controlling the power distribution device to supply power to the power sales facility at the determined sales power supply amount.

11. The plant control method according to claim 1, wherein
the plant further includes:
a nitrogen manufacturing device that manufactures nitrogen; and
a nitrogen sales device that supplies nitrogen manufactured by the nitrogen manufacturing device to the outside for sale,
the first product is hydrogen,
the second product is ammonia,
the second manufacturing device manufactures ammonia that is the second product using hydrogen that is the first product and nitrogen supplied from the nitrogen manufacturing device,
wherein the plant control method further comprises:
acquiring a nitrogen sales price that is a sales price of nitrogen,
determining a sales nitrogen supply amount that is a supply amount of nitrogen to the nitrogen sales device at least on a basis of the nitrogen sales price, and
controlling the nitrogen manufacturing device to supply nitrogen to the nitrogen sales device at the determined sales nitrogen supply amount.

12. A plant control device for controlling a plant, the plant including:
a storage device that receives and stores a manufactured first product from a first manufacturing device that manufactures the first product using power supplied from a power supply device that supplies power generated using variable renewable energy;
a second manufacturing device that manufactures a second product using the first product supplied from the storage device; and
a supply target facility of at least one of a power generation device and a sales device,
the power generation device generating power using the first product supplied from the storage device,
the sales device supplying the first product supplied from the storage device to an outside for sale,
the plant control device comprising:
a calculation circuitry; and
a control signal output circuitry, wherein
the calculation circuitry
determines a lower limit and an upper limit of a supplyable amount of the first product that can be supplied from the storage device, based on a storage amount of the first product in the storage device immediately before a target term to be controlled, the amount of the power supplied from the power supply device in the target term, and a reference range of the storage amount of the first product in the storage device,
determines a lower limit of a second supply amount, which is a supply amount of the first product to the second manufacturing device, that allows the second manufacturing device to operate continuously, and
calculates a first supply amount that is a supply amount of the first product to the sales device, the second supply amount, and a third supply amount that is a supply amount of the first product to the power generation device such that an aggregated value is maximized while satisfying a condition including the determined lower and upper limits of the supplyable amount of the first product and the determined lower limit of the second supply amount, by using an evaluation function which calculates the aggregated value by multiplying the first supply amount, the second supply amount, and the third supply amount by respective coefficients, and
the control signal output circuitry controls a flow rate control valve that controls a flow rate of the first product to a supply destination to change a throttle opening of the flow rate control valve to supply the first product by outputting a control signal to the flow rate control valve, such that the first product is supplied to the second manufacturing device at the determined second supply amount, the first product is supplied to the sales device at the determined first supply amount in a case where the plant includes the sales device, and the first product is supplied to the power generation device at the determined third supply amount in a case where the plant includes the power generation device.

13. A non-transitory computer-readable medium storing a program for causing a computer to function as the plant control device according to claim 12.

14. A plant comprising:
a storage device that receives and stores a manufactured first product from a first manufacturing device that manufactures the first product using power supplied from a power supply device that supplies power generated using variable renewable energy;

a second manufacturing device that manufactures a second product using the first product supplied from the storage device;
a supply target facility of at least one of a power generation device and a sales device; and
a plant control device, wherein
the power generation device generates power using the first product supplied from the storage device,
the sales device supplies the first product supplied from the storage device to an outside for sale, and
the plant control device includes:
a calculation circuitry; and
a control signal output circuitry,
wherein the calculation circuitry
determines a lower limit and an upper limit of a supplyable amount of the first product that can be supplied from the storage device, based on a storage amount of the first product in the storage device immediately before a target term to be controlled, the amount of the power supplied from the power supply device in the target term, and a reference range of the storage amount of the first product in the storage device,
determines a lower limit of a second supply amount, which is a supply amount of the first product to the second manufacturing device, that allows the second manufacturing device to operate continuously, and
calculates a first supply amount that is a supply amount of the first product to the sales device, the second supply amount, and a third supply amount that is a supply amount of the first product to the power generation device such that an aggregated value is maximized while satisfying a condition including the determined lower and upper limits of the supplyable amount of the first product and the determined lower limit of the second supply amount, by using an evaluation function which calculates the aggregated value by multiplying the first supply amount, the second supply amount, and the third supply amount by respective coefficients, and
the control signal output circuitry controls a flow rate control valve that controls a flow rate of the first product to a supply destination to change a throttle opening of the flow rate control valve to supply the first product by outputting a control signal to the flow rate control valve, such that the first product is supplied to the second manufacturing device at the determined second supply amount, the first product is supplied to the sales device at the determined first supply amount in a case where the plant includes the sales device, and the first product is supplied to the power generation device at the determined third supply amount in a case where the plant includes the power generation device.

* * * * *